United States Patent
Justice et al.

(10) Patent No.: US 11,623,766 B2
(45) Date of Patent: Apr. 11, 2023

(54) SYSTEMS AND METHODS FOR MANUFACTURING AIRCRAFT

(71) Applicant: The Boeing Company, Chicago, IL (US)

(72) Inventors: Jeremy Justice, Mill Creek, WA (US); Daniel Richard Smith, Jr., Woodinville, WA (US); Darrell Darwin Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 3 days.

(21) Appl. No.: 17/505,505

(22) Filed: Oct. 19, 2021

(65) Prior Publication Data

US 2022/0153449 A1 May 19, 2022

Related U.S. Application Data

(60) Provisional application No. 63/115,163, filed on Nov. 18, 2020.

(51) Int. Cl.
*B64F 5/10* (2017.01)
*B23P 21/00* (2006.01)
*B62D 65/02* (2006.01)

(52) U.S. Cl.
CPC .............. *B64F 5/10* (2017.01); *B23P 21/004* (2013.01); *B23P 2700/01* (2013.01); *B62D 65/022* (2013.01)

(58) Field of Classification Search
CPC ......... B64F 5/10; B62D 65/022; B62D 65/02; B23P 21/004
See application file for complete search history.

(56) References Cited

U.S. PATENT DOCUMENTS

| | | | | |
|---|---|---|---|---|
| 2,383,225 A | * | 8/1945 | Sorensen .................. | B64F 5/10 29/430 |
| 4,894,908 A | * | 1/1990 | Haba, Jr. ............... | B23P 21/004 29/784 |

(Continued)

FOREIGN PATENT DOCUMENTS

| | | | | |
|---|---|---|---|---|
| CN | 110893547 A | * | 3/2020 | ............ B23P 21/004 |
| EP | 0357473 A1 | * | 3/1990 | ............... E04H 5/02 |

(Continued)

OTHER PUBLICATIONS

CN-110893547-A Machine Translation (Year: 2020).*

(Continued)

*Primary Examiner* — Michael W Hotchkiss
(74) *Attorney, Agent, or Firm* — Kolitch Romano Dascenzo Gates LLC

(57) ABSTRACT

Systems and methods for manufacturing aircraft are disclosed. For example, an aircraft manufacturing system for repetitively manufacturing aircraft comprises a first manufacturing zone configured to repetitively manufacture first aircraft subassemblies, a second manufacturing zone configured to repetitively manufacture second aircraft subassemblies, and a third manufacturing zone configured to receive the first aircraft subassemblies from the first manufacturing zone, to receive the second aircraft subassemblies from the second manufacturing zone, and to repetitively assemble the first aircraft subassemblies and the second aircraft subassemblies into the aircraft. In another example, a method for repetitively manufacturing aircraft assemblies comprises assembling first aircraft subassemblies and second aircraft subassemblies in parallel on separate assembly lines at a common geographic region; and transferring the first aircraft subassemblies and the second aircraft subas- (Continued)

semblies to a final assembly facility located in the same common geographic region.

20 Claims, 6 Drawing Sheets

(56) References Cited

U.S. PATENT DOCUMENTS

| | | | | |
|---|---|---|---|---|
| 5,090,105 | A * | 2/1992 | DeRees | B62D 63/025 29/469 |
| 6,317,954 | B1 * | 11/2001 | Cunningham | G01B 11/002 29/709 |
| 6,513,231 | B1 * | 2/2003 | Hafenrichter | B23Q 1/25 29/721 |
| 7,194,326 | B2 * | 3/2007 | Cobb | G05B 19/41805 700/114 |
| 7,331,439 | B2 * | 2/2008 | Degain | B23K 37/047 29/430 |
| 7,614,154 | B2 * | 11/2009 | Cobb | B64F 5/10 356/615 |
| 8,474,683 | B2 * | 7/2013 | Kilibarda | B23K 37/047 228/49.1 |
| 8,539,658 | B2 * | 9/2013 | Munk | B64F 5/10 29/281.1 |
| 8,661,684 | B1 * | 3/2014 | Boyd | B21D 53/92 29/897.2 |
| 8,670,855 | B2 * | 3/2014 | Eickhorst | G05B 19/41865 700/95 |
| 8,713,780 | B2 * | 5/2014 | Kilibarda | B65G 35/00 29/430 |
| 9,434,432 | B2 * | 9/2016 | Grevener | B62D 65/12 |
| 9,581,983 | B2 * | 2/2017 | Kilibarda | G05D 1/0225 |
| 10,000,298 | B2 * | 6/2018 | Cobb | B64F 5/10 |
| 10,427,254 | B2 * | 10/2019 | Day | B64F 5/10 |
| 10,501,209 | B2 * | 12/2019 | Cobb | G05B 19/402 |
| 10,967,518 | B2 * | 4/2021 | Neuhaus | G05B 19/41805 |
| 2004/0040154 | A1 * | 3/2004 | Day | B64F 5/10 29/525.01 |
| 2009/0112349 | A1 * | 4/2009 | Cobb | B64F 5/10 29/714 |
| 2009/0234487 | A1 * | 9/2009 | Kimura | B62D 65/18 700/112 |
| 2009/0285666 | A1 * | 11/2009 | Kilibarda | B62D 65/02 29/430 |
| 2010/0058708 | A1 * | 3/2010 | Tondini | B62D 65/00 52/741.1 |
| 2011/0010912 | A1 * | 1/2011 | Bausen | B64F 5/10 29/428 |
| 2011/0054694 | A1 * | 3/2011 | Munk | B64F 5/10 700/275 |
| 2011/0270571 | A1 * | 11/2011 | Cobb | B64F 5/10 702/150 |
| 2014/0007432 | A1 * | 1/2014 | Grevener | B62D 65/12 29/897.2 |
| 2014/0090252 | A1 * | 4/2014 | Sisco | B64F 5/50 29/33 R |
| 2014/0157588 | A1 * | 6/2014 | Boyd | B64F 5/10 29/721 |
| 2014/0309969 | A1 * | 10/2014 | Senesac | G06Q 50/30 703/1 |
| 2015/0314889 | A1 * | 11/2015 | Day | B23B 41/00 408/69 |
| 2016/0009422 | A1 * | 1/2016 | Oberoi | B21J 15/142 182/141 |
| 2016/0354883 | A1 * | 12/2016 | Vogt | B61B 13/00 |
| 2017/0239706 | A1 * | 8/2017 | Boyd | B64C 3/00 |
| 2018/0104778 | A1 * | 4/2018 | Hirai | G05B 19/418 |
| 2021/0197984 | A1 * | 7/2021 | Datas | B64F 5/10 |
| 2021/0237905 | A1 * | 8/2021 | Godard | B64C 1/068 |
| 2021/0403109 | A1 * | 12/2021 | Miyake | B66F 7/26 |

FOREIGN PATENT DOCUMENTS

| | | |
|---|---|---|
| EP | 0957336 A2 | 11/1999 |
| EP | 3043298 A1 | 7/2016 |

OTHER PUBLICATIONS

Canis, The Motor Vehicle Supply Chain: Effects of the Japanese Earthquake and Tsunami, 2011, p. 4 (Year: 2011).*
EP0357473A1 Machine Translation (Year: 1990).*
Blösch et al. "Flexible Manufacturing even in the Aircraft Industry," *IPE Industrial & Production Engineering*, Munich, Germany, vol. 15, No. 2, pp. 44 and 46-49, May 1991.
European Patent Office, Extended European Search Report for related European patent application No. 21194096.0, dated Feb. 21, 2022.

* cited by examiner

SYSTEMS AND METHODS FOR MANUFACTURING AIRCRAFT

RELATED APPLICATION

The present application is a non-provisional of and claims priority to U.S. Provisional Patent Application No. 63/115,163, filed on Nov. 18, 2020, entitled "SYSTEMS AND METHODS FOR MANUFACTURING AIRCRAFT," the complete disclosure of which is incorporated by reference.

FIELD

The present disclosure relates to systems and methods for manufacturing aircraft.

BACKGROUND

Aircraft, particularly commercial aircraft, are large, complex, and difficult, if not impossible, to manufacture on conventional assembly lines. Instead, many of an aircraft's large structures (e.g., wings, fuselage sections, tail, etc.) are manufactured as subassemblies at different locations and subsequently brought to a central final assembly location. In fact, many such structures may be manufactured at locations that are geographically remote from each other (e.g., different cities, countries, and/or continents) by various third party suppliers and then shipped to the aircraft manufacturer's final assembly facility for processing and final assembly. Such production approaches are both time-inefficient and resource-inefficient. Thus, more efficient production techniques that produce aircraft faster (i.e. at higher production rates) and/or at lower cost are desired.

SUMMARY

Systems and methods for manufacturing aircraft are disclosed. For example, an aircraft manufacturing system for repetitively manufacturing aircraft comprises a first manufacturing zone configured to repetitively manufacture first aircraft subassemblies, a second manufacturing zone configured to repetitively manufacture second aircraft subassemblies, and a third manufacturing zone configured to receive the first aircraft subassemblies from the first manufacturing zone, to receive the second aircraft subassemblies from the second manufacturing zone, and to repetitively assemble the first aircraft subassemblies and the second aircraft subassemblies into the aircraft. In some examples, the first manufacturing zone, the second manufacturing zone, and the third manufacturing zone are located in the same geographic region. In some examples, one or more of the manufacturing zones includes a fractional pulse assembly line that is configured to fractionally pulse the aircraft subassemblies by less than their length.

In another example, a method for repetitively manufacturing aircraft assemblies comprises assembling first aircraft subassemblies and second aircraft subassemblies in parallel on separate assembly lines at a common geographic region, and transferring the first aircraft subassemblies and the second aircraft subassemblies to a final assembly facility located in the same common geographic region. In some examples, the first aircraft subassemblies are aircraft wings, and the second aircraft subassemblies are portions of an aircraft fuselage. In some examples, the method optionally includes sending different subassemblies and/or components thereof down the same assembly line. Additionally or alternatively, the method optionally includes fractionally pulsing one or more of the first aircraft subassemblies and constituent parts thereof down the first assembly line and/or fractionally pulsing one or more of the second aircraft subassemblies and the constituent parts thereof down the second assembly line.

DESCRIPTION

Figure 1:
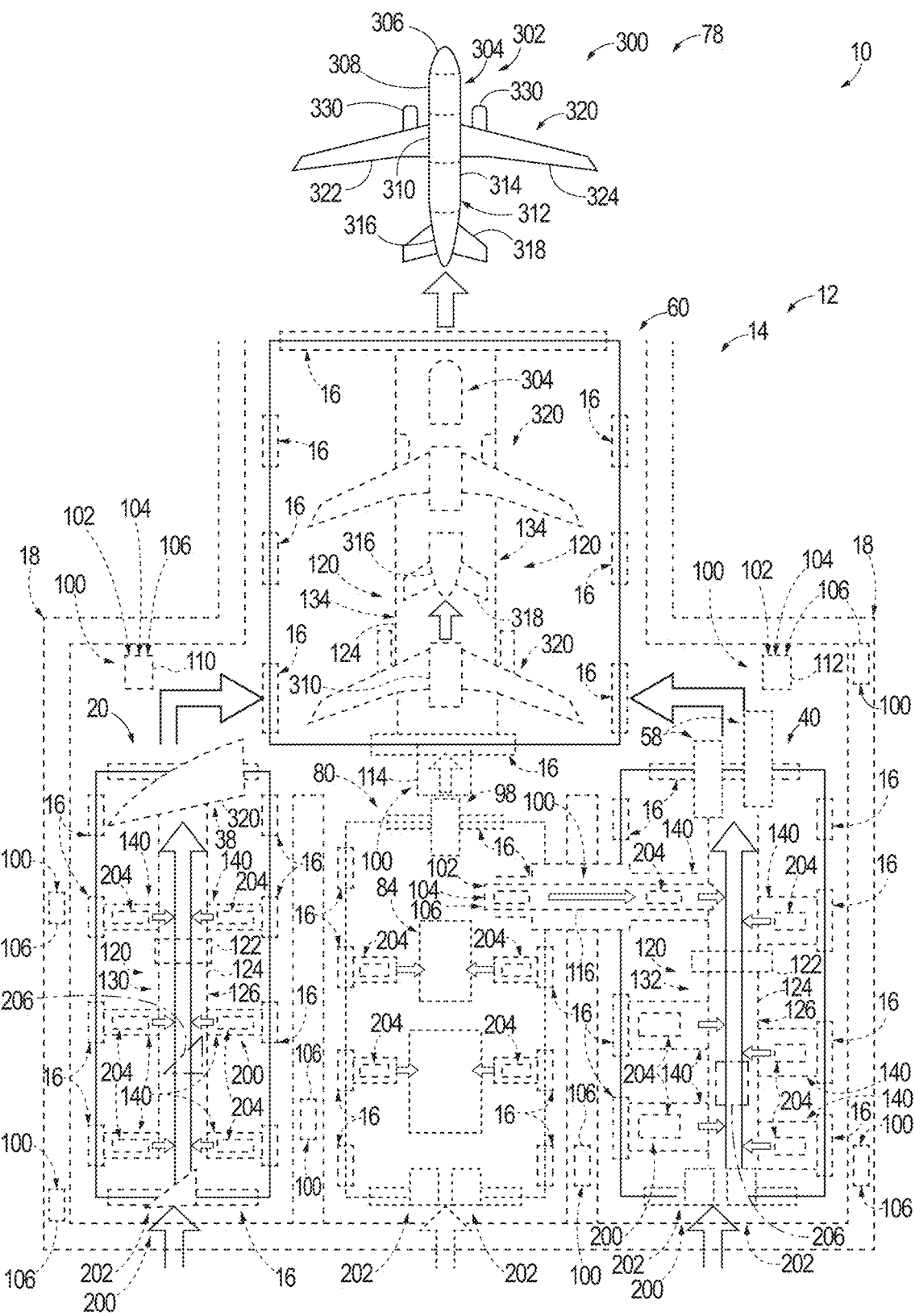
FIG. 1 is schematic representation of aircraft manufacturing systems according to the present disclosure.

Systems and methods for manufacturing aircraft are disclosed. Generally, in the figures, elements that are likely to be included in a given example are illustrated in solid lines, while elements that are optional to a given example are illustrated in broken lines. Block arrows illustrate example movement of elements in space. However, elements that are illustrated in solid lines are not essential to all examples of the present disclosure, and an element shown in solid lines may be omitted from a particular example without departing from the scope of the present disclosure.

Conventionally, aircraft, particularly commercial aircraft, are manufactured by building the large structures of the aircraft (e.g., wings, tail, fuselage sections, etc.) separately, as discrete subassemblies, often at different geographic locations (e.g., different cities, countries, and/or continents). These large structures are then transferred to a central facility (also referred to herein as a final assembly facility) where they are processed and assembled to form the aircraft. The present disclosure on the other hand, provides systems and methods for manufacturing at least some of these large structures at one geographic region (e.g., proximate to, adjacent to, and/or within the central facility), to reduce production inefficiencies and/or costs. In particular, manufacturing at least some of the large structures in the same geographic region as the central facility may reduce and/or eliminate shipping times and costs. Further, in some examples, the large structures of the present disclosure are manufactured in parallel and/or produced at approximately the same rate at the common geographic region so that final assembly is not delayed.

In conventional approaches, because the large structures may be manufactured by multiple third party suppliers at various remote geographic regions, it is difficult to synchronize the arrival times of all the large structures at the final assembly facility. Further, the large structures may be unpredictably delayed for various reasons including supplier manufacturing delays, shipping delays, inclement weather, etc. Since the large structurers may be manufactured by multiple third party suppliers at many different locations around the world, the likelihood of a delay of at least one of the large structures is relatively high. Thus, final assembly of the aircraft may be postponed and may not commence until all of the necessary large structures arrive. By manufacturing the large structures in parallel and/or at approximately the same rate in the same geographic region, the present disclosure reduces and/or entirely eliminates final assembly delays. That is, the systems and methods of the present disclosure may synchronize the arrivals of the large structures at the final assembly facility, thereby permitting more rapid and consistent final assembly of the aircraft. Stated slightly differently, because the large structures may arrive just in time (approximately simultaneously) to the final assembly facility, the final assembly facility may not have to wait as long for all of the large structures to arrive, and may begin final assembly sooner and/or more frequently than conventional aircraft manufacturing approaches.

Additionally or alternatively, the actual manufacturing process of the present disclosure may be more efficient and/or faster than conventional manufacturing approaches that utilize third party suppliers. In some examples of the present disclosure, aircraft components are fractionally pulsed down an assembly line such that multiple workstations may have access to different portions of a component at the same time. This configuration permits the various workstations to perform work processes (e.g., different work processes) simultaneously on different areas of a given component. In this way, work processes (e.g., different work processes) may be performed in parallel with one another, rather than in series. Such parallel processing may increase production rates, and reduce the time needed to work on the components. In particular, increasing the workstation density on the assembly line enables more work to be performed on a component at any given time, thereby making the manufacturing process more efficient. Increasing the packing density of the workstations also may reduce the total footprint (area) of the manufacturing system. That is, by breaking up the work processes into smaller, more modular units, workstations, work-performing devices (e.g., machines, robots, tools, etc.), and constituent parts of the aircraft may be packed closer together, reducing the overall size of the manufacturing system.

Breaking a component down into multiple work areas also shrinks the effective work areas, reducing the amount of tool, robot, machine, and/or human movement needed to complete the work processes, and therefore reducing production inefficiencies. Thus, workers, tools, machines, and/or robots may not need to move as far to complete work processes (the work processes may be completed using smaller ranges of motion). Further, because the work areas may be smaller, the tools and/or machines used by workers (also referred to herein as manufacturing personnel) at these work areas may be made smaller and/or lighter, thereby increasing worker safety.

In addition to not having to move as far to complete the work processes, the tools, robots, machines, etc., may not have to complete as many work processes. For example, each tool, robot, and/or machine may only be responsible for completing one work process. Thus, by breaking components down into multiple work areas and/or by fractionally pulsing components, the size, complexity, and cost of the tools, robots, machines, and/or other work-performing devices may be reduced. Stated slightly differently, the present disclosure provides smaller, simpler, and cheaper work-performing devices than conventional aircraft manufacturing approaches.

Fractionally pulsing the components also may inhibit worker lethargy and encourage worker productivity because components move down the assembly line more often and/or regularly than conventional pulsed assembly lines. Stated slightly differently, workers experience less idle time and therefore may be less prone to boredom and/or listlessness. Further, the more frequent pulsing of a fractional line may increase worker accountability because unfinished/incomplete work may be more visible to other workers and supervisors. In particular, incomplete work may hold up the line (i.e., interrupt/pause normal line movement), which, on a fractional pulse line that pulses more frequently, may be more noticeable/apparent, thereby ensuring that workers are held accountable for their work.

Figure 2:
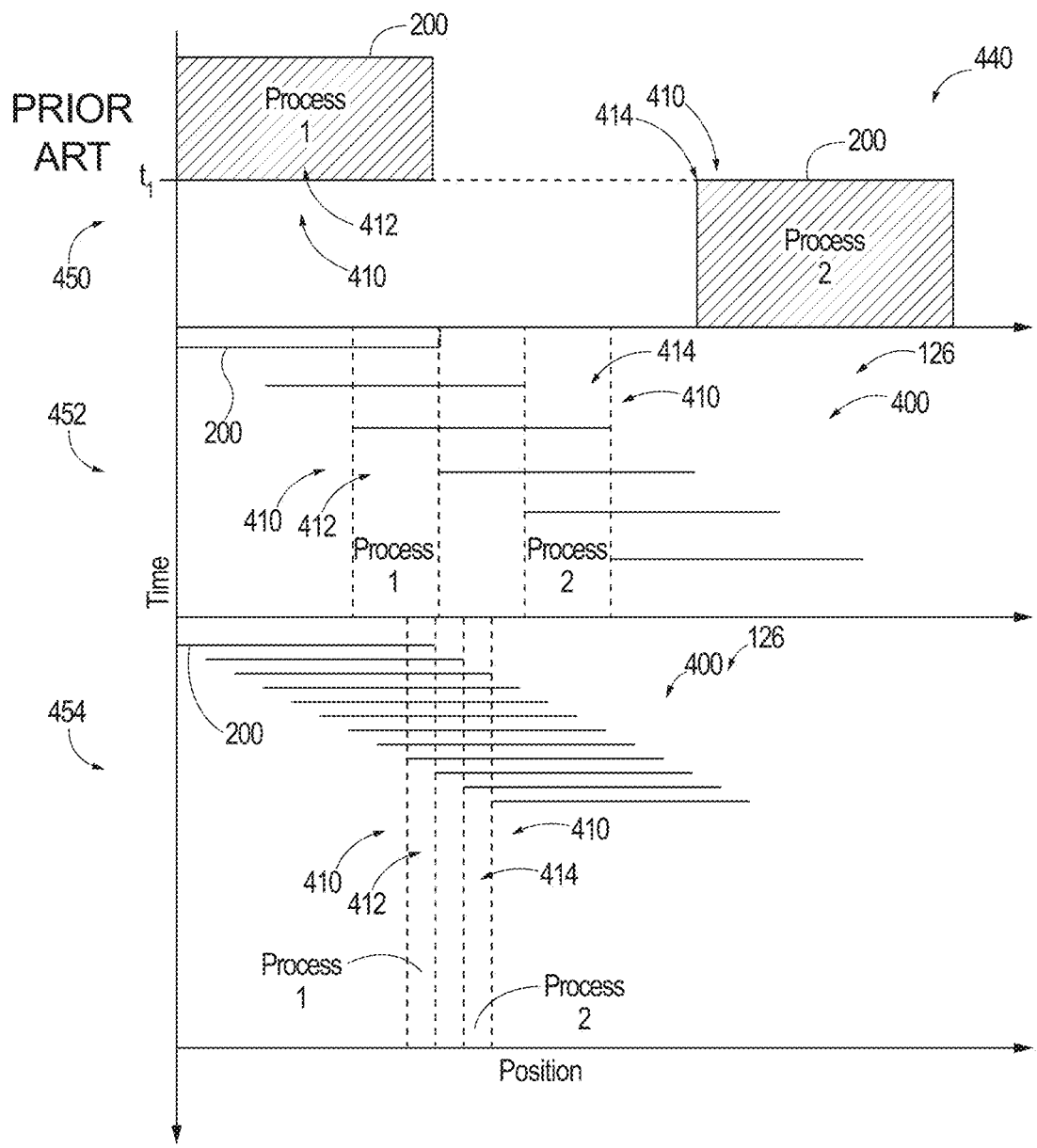
FIG. 2 is a time-lapsed schematic representation comparing a prior art assembly line to fractional pulse assembly lines according to the present disclosure.
Figure 3:
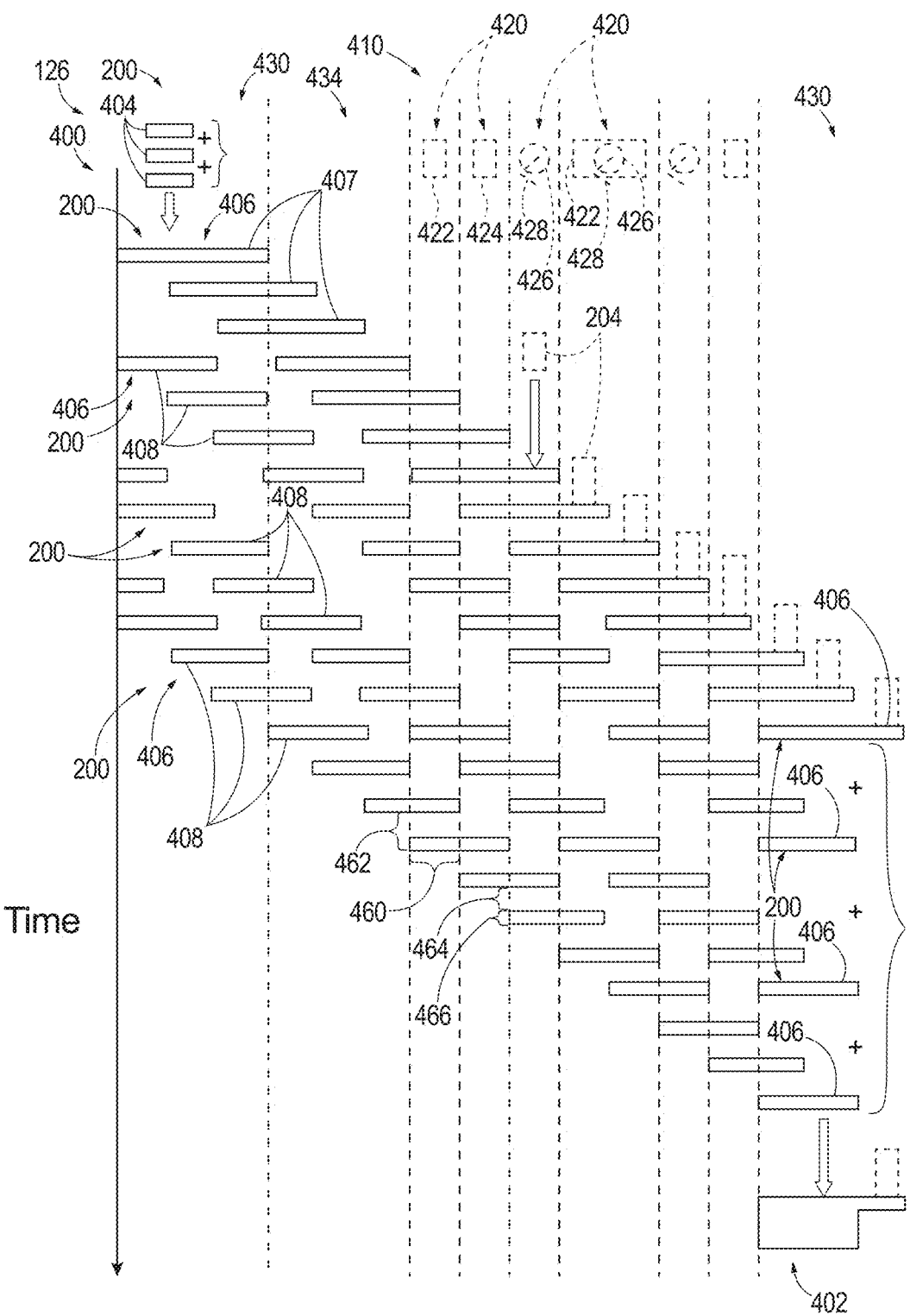
FIG. 3 is a time-lapsed schematic representation of an example fractional pulse assembly line of the aircraft manufacturing system of FIG. 1.

FIGS. 1-6 illustrate systems and methods for manufacturing aircraft according to the present disclosure. FIGS. 1-3 provide examples of aircraft manufacturing systems 10 according to the present disclosure, and/or components or portions thereof. In particular, FIG. 1 schematically illustrates examples of aircraft manufacturing systems 10, and FIGS. 2-3 show examples of fractional pulse assembly lines 126 that may be included in aircraft manufacturing systems 10. Where appropriate, the reference numerals from the schematic illustration of FIG. 1 are used to designate corresponding parts of the examples of FIGS. 2-3; however, the examples of FIGS. 2-3 are non-exclusive and do not limit the fractional pulse assembly lines 126 to the illustrated embodiments of FIGS. 2-3. That is, aircraft manufacturing systems 10 are not limited to the specific embodiments of FIGS. 2-3, and fractional pulse assembly lines 126 may incorporate any number of the various aspects, configurations, characteristics, properties, etc. of fractional pulse assembly lines that are illustrated in and discussed with reference to the schematic representations of FIG. 1 and/or the embodiments of FIGS. 2-3, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 2-3; however, it is within the scope of the present disclosure that the previously discussed features, variants, etc. may be utilized with the examples of FIGS. 2-3.

Figure 4:
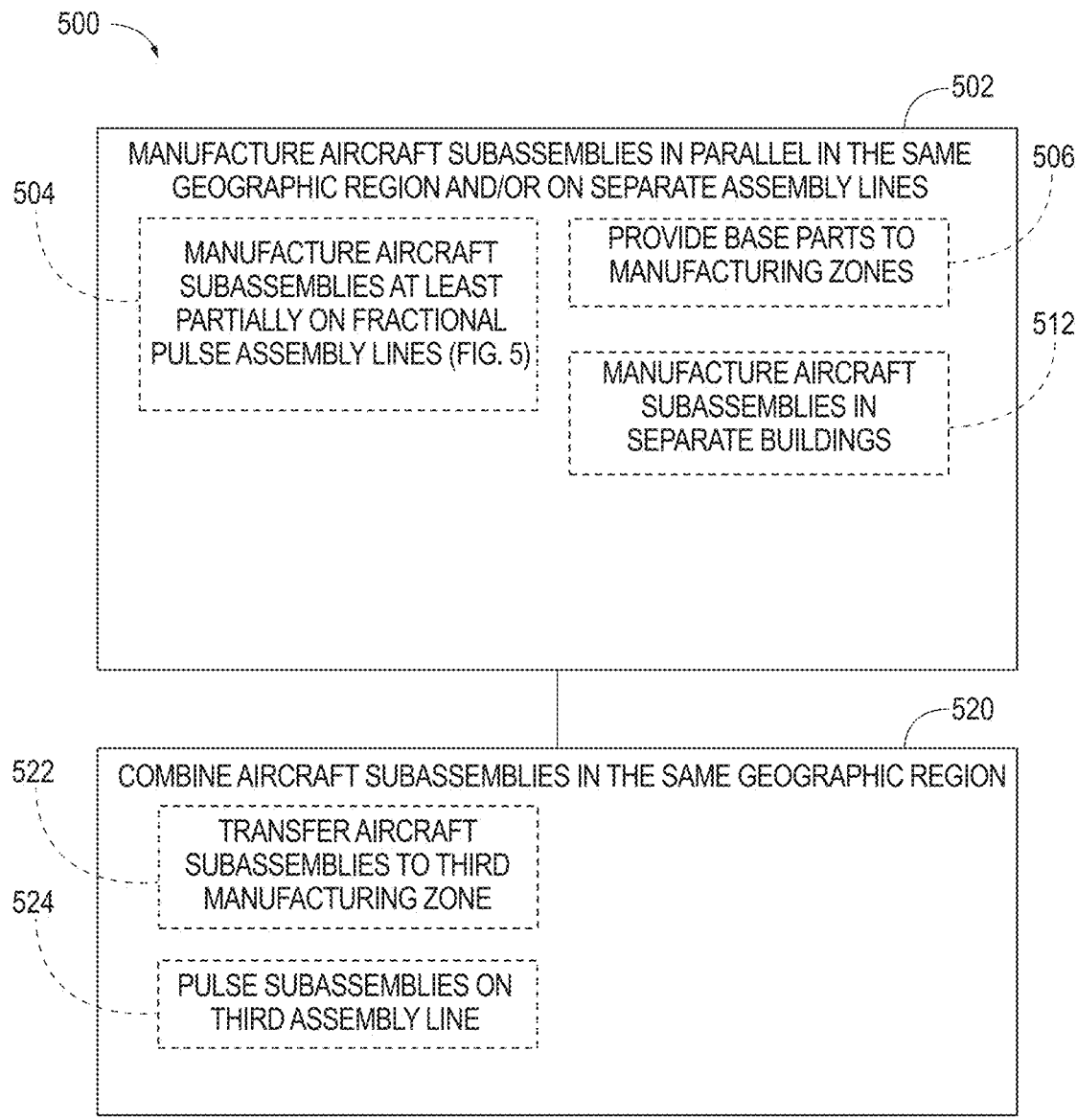
FIG. 4 is a flowchart schematically representing methods, according to the present disclosure, for manufacturing an aircraft at one geographic region.
Figure 5:
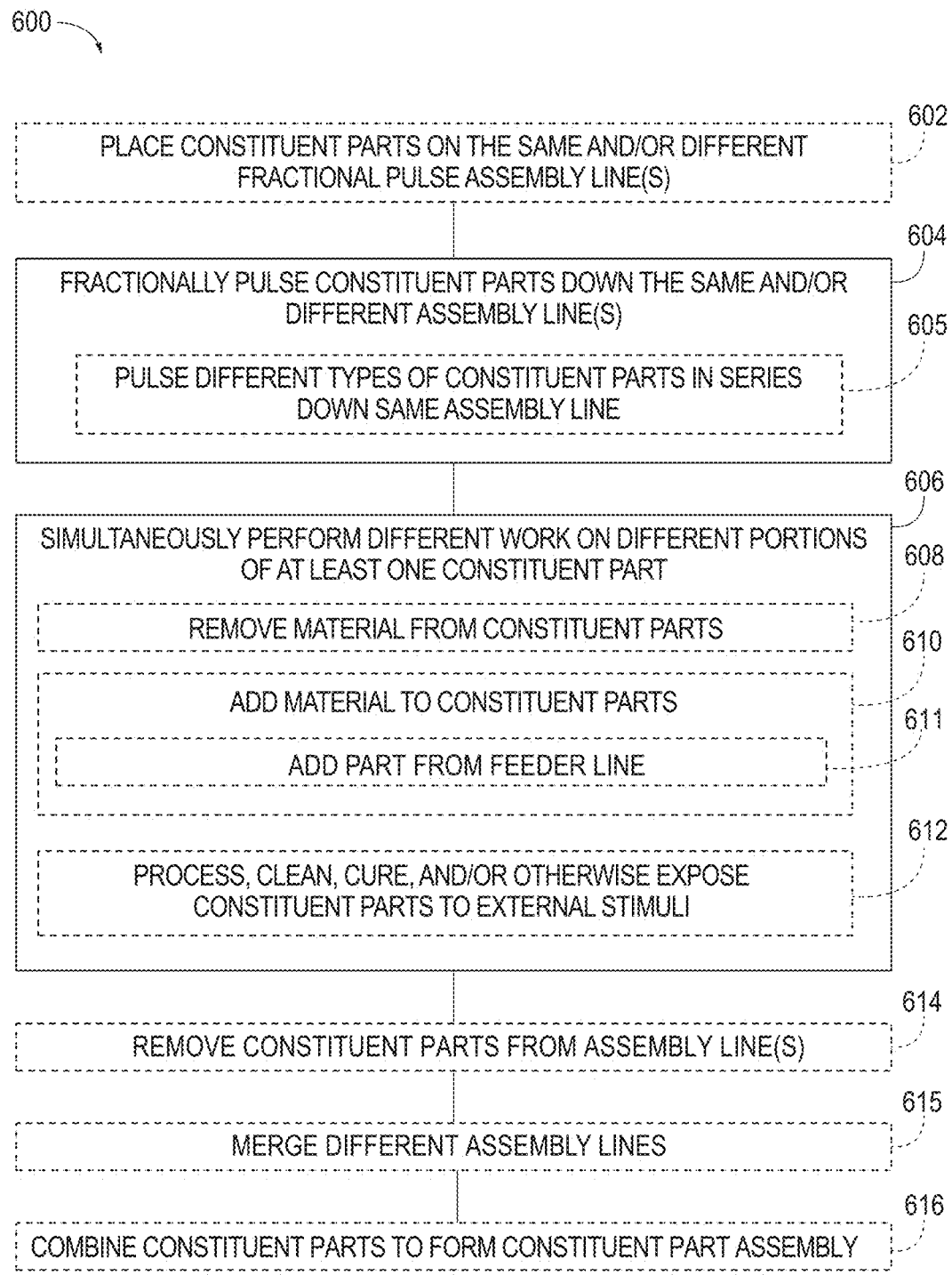
FIG. 5 is a flowchart schematically representing methods, according to the present disclosure, for operating a fractional pulse assembly line.
Figure 6:
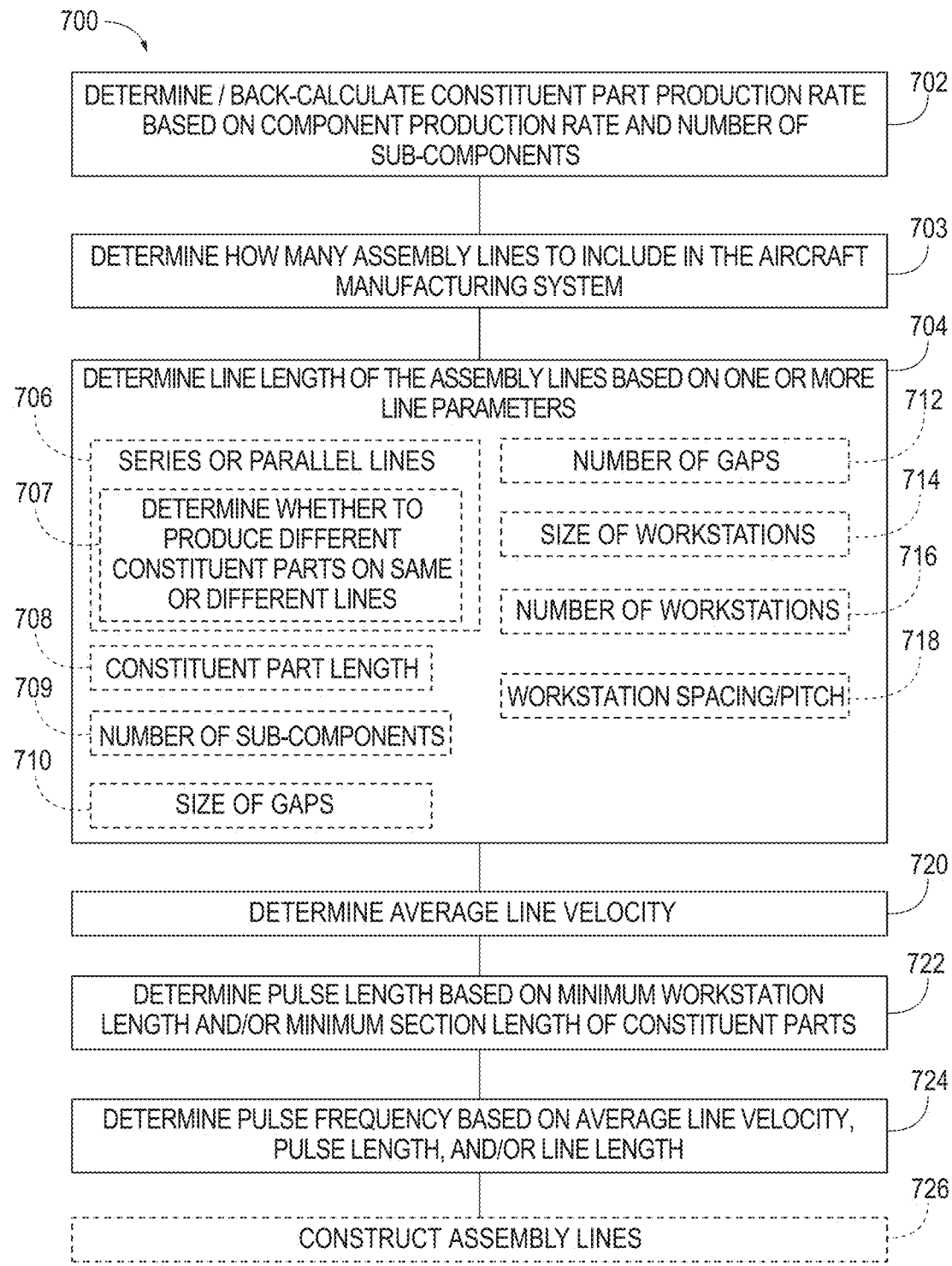
FIG. 6 is a flowchart schematically representing methods, according to the present disclosure, for forming a fractional pulse assembly line.

FIGS. 4-6 illustrate flowcharts schematically representing methods 500, 600, and 700. Specifically, FIG. 4 illustrates methods 500 for manufacturing aircraft according to the present disclosure, FIG. 5 illustrates methods 600 for operating a fractional pulse assembly line of the present disclosure, and FIG. 6 illustrates methods 700 for forming a fractional pulse assembly line of the present disclosure.

As schematically illustrated in FIG. 1, aircraft manufacturing systems 10 are configured to produce aircraft 300. Aircraft 300 typically include at least a fuselage 302, wings 320, engine(s) 330, and a tail 318. Fuselage 302 may include any number of discrete sections. In some examples, fuselage 302 includes (e.g., may be broken down into) a forward fuselage section 304 positioned forward of wings 320, an intermediate fuselage section 310 (also referred to as wing fuselage section 310 and/or intermediate main cabin portion 310) positioned behind forward fuselage section 304 (e.g., where wings 320 tie into the fuselage), and an aft fuselage section 312 positioned behind intermediate fuselage section 310.

In some further such examples, forward fuselage section 304 includes a nose portion 306 (also referred to as a cockpit portion 306) positioned at a front of the aircraft and a forward main cabin portion 308 positioned behind the nose portion, between nose portion 306 and intermediate fuselage section 310. Additionally or alternatively, wing fuselage section 310 includes a wing box and an over-wing fuselage portion. The over-wing fuselage portion may be positioned above the wing box, and together, the wing box and over-wing fuselage portion may form a complete (e.g., approximately cylindrical) section of the fuselage. As an example, the over-wing fuselage portion may comprise a hemispherical cylindrical portion (i.e., half barrel) of the intermediate fuselage section. Additionally or alternatively, aft fuselage section 312 includes an aft main cabin portion 314 and a tail portion 316 positioned behind the aft main cabin portion. Thus, aft main cabin portion 314 may be positioned between intermediate fuselage section 310 and tail portion 316. Wings 320 include a left wing 322 and a right wing 324 configured to be mirror images of one another and/or positioned on opposite sides of fuselage 302.

In some examples, engines 330 include two engines, one coupled to each of the wings (as depicted in the example of FIG. 1). In some examples, tail 318 includes one or more aerodynamic structures/surfaces such as a vertical stabilizer (also referred to herein as tail fin) and/or a horizontal stabilizer. Tail 318 also may be referred to herein as empennage 318 and/or tail assembly 318. The aforementioned components of aircraft 300 are referred to collectively herein as section assemblies 340 and/or aircraft large structures 340. Thus, section assemblies 340 include the different portions of fuselage 302 (e.g., tail portion 316, aft main cabin portion 314, intermediate main cabin portion 310, forward main cabin portion 308, and nose portion 306), the wings, the tail, and the engines.

Aircraft manufacturing systems 10 include manufacturing zones 12 that are configured to produce constituent parts of aircraft 300 (e.g., section assemblies, subassemblies, large structures, components, subcomponents, base parts, subassembly parts, and/or other parts of aircraft 300), and/or the entire aircraft themselves. In some examples, a first manufacturing zone 20, a second manufacturing zone 40, and a fourth manufacturing zone 80 when included, are configured to produce aircraft subassemblies which are then assembled at a third manufacturing zone 60 to produce aircraft assembly 78. In particular, first manufacturing zone 20, second manufacturing zone 40, and fourth manufacturing zone 80 when included, are configured to produce a first aircraft subassembly 38, a second aircraft subassembly 58, and a third aircraft subassembly 98, respectively, which are assembled together in a third manufacturing zone 60 to produce an aircraft assembly 78. Thus, in the description herein, "subassembly" is used to describe constituent parts that are assembled together to produce aircraft assembly 78. In some examples, one or more of the aircraft subassemblies (e.g., first aircraft subassembly 38, second aircraft subassembly 58, third aircraft subassembly 98, etc.) include and/or are the same as one or more of the large aircraft structures, as discussed previously. Thus, in some such examples, one or more of first manufacturing zone 20, second manufacturing zone 40 and fourth manufacturing zone 80 are configured to produce section assemblies 340 and/or third manufacturing zone 60 is configured to produce aircraft 300. However, in other examples, none of the aircraft subassemblies include the large aircraft structures.

"Constituent part" is used generically herein to refer to any and all parts of aircraft 300. "Component" is used herein to refer to a first order constituent part of a given aircraft structure, and "sub-component" is used herein to refer to a second order constituent part of a given aircraft structure (i.e., a component of a component). As an example, first aircraft subassembly 38 and/or second aircraft subassembly 58 are components of aircraft assembly 78, and they in turn include their own individual components that are sub-components of aircraft assembly 78. Thus, "component" and "sub-component" are relative terms that are used to refer to a given constituent part's relationship to the one or more larger structures within which it is included. "Constituent part" on the other hand, is used herein to refer collectively to any and all parts of a structure (e.g., any and all parts of aircraft assembly 78), regardless of how many orders of sub-components and components separate the constituent part from the structure.

Manufacturing zones 12 are distinguishable by their outputs (e.g., the section assemblies, aircraft subassemblies, components, parts, etc., manufactured, assembled, and/or otherwise produced by the manufacturing zones) and/or by the processes performed therein. That is, each of the manufacturing zones is configured to produce different outputs. For example, first manufacturing zone 20 is configured to manufacture, assemble, produce, and/or otherwise output first aircraft subassembly 38, second manufacturing zone 40 is configured to manufacture, assemble, produce, and/or otherwise output second aircraft subassembly 58, different than the first aircraft subassembly 38, and third manufacturing zone 60 is configured to manufacture, assemble, produce, and/or otherwise output aircraft assembly 78. Third manufacturing zone 60 also is configured to receive the first aircraft subassembly from first manufacturing zone 20 and the second aircraft subassembly from second manufacturing zone 40, and to assemble the first aircraft subassembly and the second aircraft subassembly to manufacture, assemble, produce, and/or otherwise output aircraft assembly 78.

In some examples, aircraft assembly 78 is aircraft 300, and thus, third manufacturing zone 60 is configured to produce aircraft 300. Additionally or alternatively, first aircraft subassembly 38 and/or the second aircraft subassembly 58 is/are aircraft large structures 340 (e.g., wings, one or more fuselage sections, tail, etc.), and thus, first manufacturing zone 20 and/or second manufacturing zone 40 is/are configured to produce section assemblies 340. In some such examples, first aircraft subassembly 38 includes wings 320 and second aircraft subassembly 58 includes at least a portion of fuselage 302 (e.g., at least forward main cabin portion 308 and aft main cabin portion 314), and thus, first manufacturing zone 20 is configured to produce wings 320 and second manufacturing zone 40 is configured to produce at least a portion of fuselage 302, including one or more of forward main cabin portion 308, aft main cabin portion 314, nose portion 306, and/or tail portion 316. In some such examples, second manufacturing zone 40 is configured to produce forward main cabin portion 308 and aft main cabin portion 314.

When first manufacturing zone 20 is configured to produce wings 320, the first manufacturing zone may be configured to output the wings in their final form and/or substantially in their final form. That is, the wings may only need small cosmetic changes (such as paint, detailing, coatings, curing, or other surface treatments) before being ready for flight and/or delivery to a customer. Thus, the wings may comprise all of their constituent parts when leaving first manufacturing zone 20. When second manufacturing zone 40 is configured to produce at least a portion of fuselage 302, the portions of fuselage 302 leaving second manufacturing zone 40 also may be flight ready and/or ready for final assembly to produce aircraft 78, but may not be ready for customer use. As an example, the portions of fuselage 302 leaving second manufacturing zone 40 may not include interior features such as flooring, seating, lighting, and/or other customer-specific customizations.

In some examples, manufacturing zones 12 include additional manufacturing zones. As one such example, manufacturing zones 12 include fourth manufacturing zone 80 that is configured to produce third aircraft subassembly 98 that is different than first aircraft subassembly 38 and second aircraft subassembly 58 and/or that is not configured to be produced by either first manufacturing zone 20 or second manufacturing zone 40. Thus, when included, fourth manufacturing zone 80 is configured to produce a subassembly that is different than first aircraft subassembly 38 and second aircraft subassembly 58, but is nonetheless configured to be supplied to third manufacturing zone 60 and assembled to form aircraft assembly 78. As an example, fourth manufacturing zone 80 is configured to produce one or more of wing fuselage section 310 (including a wing box and a top half/portion of the wing fuselage section), tail 318, nose portion 306 of fuselage 302, tail portion 316 of fuselage 302, landing gear, and/or engines. However in some examples, the engines and/or landing gear is/are not manufactured by the manufacturing zone 40 and are delivered to the third manufacturing zone 60 from one or more third party suppliers.

In some examples, tail portion 316 and/or nose portion 306 of fuselage 302 are output to second manufacturing zone 40 before delivery to the third manufacturing zone. Additionally or alternatively, wing fuselage section 310 is output directly to third manufacturing zone 60.

Manufacturing zones 12 also may be referred to herein as production zones, assembly zones, manufacturing regions, manufacturing locations, manufacturing facilities, manufacturing hangars, manufacturing wings, and/or manufacturing plants. As discussed above, the manufacturing zones differ in the type(s) of aircraft components, aircraft subassemblies, assemblies, and/or other aircraft parts they are configured to produce and/or the type(s) of processes they are configured to perform.

In some examples, two or more of the manufacturing zones are physically separated from (i.e., spaced away from) one another, but not so far that they are in different geographic regions (e.g., different cities, different counties, different states, different provinces, different administrative regions, different countries, and/or different continents). As an example, first manufacturing zone 20 and second manufacturing zone 40 are physically separated from one another. Additionally or alternatively, third manufacturing zone 60 is physically separated from first manufacturing zone 20 and/or second manufacturing zone 40. When included, fourth manufacturing zone 80 is physically separated from the other manufacturing zones, in some examples. However, in other examples, fourth manufacturing zone 80 is not physically separated from at least one of the manufacturing zones (e.g., third manufacturing zone 60) and thus may be considered to overlap with or be within another manufacturing zone 12.

When two or more of the manufacturing zones are physically separated from one another, they are physically separated from one another by at least 1 meter (m), at least 5 m, at least 10 m, at least 20 m, at least 30 m, at least 40 m, at least 50 m, at least 75 m, at least 100 m, at most 3 kilometers (km), at most 2 km, at most 1 km, at most 0.75 km, at most 0.5 km, at most 0.3 km, at most 0.2 km, at most 0.1 km, at most 75 m, at most 50 m, and/or at most 25 m. As just one such example, first manufacturing zone 20 and second manufacturing zone 40 are physically separated from one another by at least 5 m and at most 5 km.

Additionally or alternatively, two or more of manufacturing zones 12 are not spaced away from another. As one such example, two or more of manufacturing zones 12 are adjacent to one another. As another example, two or more of manufacturing zones 12 overlap with one another. When two or more of manufacturing zones 12 are not spaced away from one another, they may nevertheless be distinguished from one another by their outputs and/or work processes performed therein.

In some examples, manufacturing zones 12 include one or more buildings 14 that define the physical bounds of manufacturing zones 12. When included, one or more buildings 14 include walls that define the limits (e.g., square footage) of manufacturing zones 12. Additionally or alternatively, one or more buildings 14 include ceilings, floors, etc.

In some examples, one or more buildings 14 include only one building and manufacturing zones 12 are all included within the one building. In some such examples, the building includes wings, and two or more of the manufacturing zones are physically separated from one another in discrete wings of the building, but nonetheless connected to one another as part of the one building. As one such example, first manufacturing zone 20 and second manufacturing zone 40 comprise different wings of the building (and thus are physically separated from one another), but are connected to one another by third manufacturing zone 60. As one such example, first manufacturing zone 20 and second manufacturing zone 40 are joined to different parts of third manufacturing zone 60 to form two physically distinct, but connected wings.

However, in other examples, one or more buildings 14 include more than one building and two or more of the manufacturing zones are included in different buildings. That is, two or more of the manufacturing zones are included in their own discrete buildings that are physically separated from one another and are not physically connected by walls or other building structures. As an example, first manufacturing zone 20 is included in a first building, and second manufacturing zone 40 is included in a second building. In some such examples, first manufacturing zone 20 and/or second manufacturing zone 40 is/are physically separated from third manufacturing zone 60, and thus the outputs of first manufacturing zone 20 and/or second manufacturing zone 40 are transported between first manufacturing zone 20 and/or second manufacturing zone 40 and third manufacturing zone 60, over a distance/gap separating first manufacturing zone 20 and/or second manufacturing zone 40 from third manufacturing zone 60.

Thus, in some examples, such as where two of more of manufacturing zones 12 are physically separated from one another in different buildings, aircraft manufacturing systems 10 include one or more transportation devices 100 that are configured to transport components, sub-components, assemblies, aircraft subassemblies and/or other aircraft parts to, from, and/or between one or more of the manufacturing zones. In some examples, a transportation device 100 includes one or more of a hoist mechanism 102, a conveyor system 104, and/or a shuttle 106. Hoist mechanisms 102 are configured to lift aircraft constituent parts. As examples, a hoist mechanism 102 may include a crane and/or a pulley system. In some examples, a hoist mechanism 102 is configured to rotate, pivot, translate, and/or otherwise move about a fixed point. Conveyor systems 104 include any suitable conveyor, such as a roller conveyor, belt conveyor, chain conveyor, etc. Shuttles 106 may include a motorized land, water, and/or aerial vehicle that is configured to travel to, from, between, and/or around one or more of the manufacturing zones to transport constituent parts. As examples, shuttles 106 may include one or more of a barge, cargo ship, truck, bus, van, tractor, train, drone, and/or helicopter In one example, a first transportation device 110 is configured to transport constituent parts between first manufacturing zone 20 and third manufacturing zone 60. As an example, first transportation device 110 includes a crane that is configured to transport first aircraft subassembly 38 from first manufacturing zone 20 to third manufacturing zone 60. In some such examples, the crane is a gantry crane or other type of elevated rolling mechanism. Additionally or alternatively, transportation devices 100 may include a second transportation device 112 that is configured to transport constituent parts between second manufacturing zone 40 and third manufacturing zone 60. When fourth manufacturing zone 80 is included, transportation devices 100 additionally or alternatively may include a third transportation device 114 that is configured to transport constituent parts between fourth manufacturing zone 80 and third manufacturing zone 60 and/or a fourth transportation device 116 that is configured to transport constituent parts between fourth manufacturing zone 80 and second manufacturing zone 40. As an example, fourth transportation device 116 includes a conveyor system and/or a gantry crane or other movable hoist mechanism that is configured to transport parts of aircraft 300 from fourth manufacturing zone 80 to second manufacturing zone 40.

In some examples, third transportation device 114 is configured to transport intermediate fuselage section 310 (including the wing box and/or upper half/portion of the intermediate fuselage section) from fourth manufacturing zone 80 to third manufacturing zone 60.

In some examples, fourth transportation device 116 is configured to transfer at least a portion of fuselage 302 from fourth manufacturing zone 80 to second manufacturing zone 40. In some such examples, fourth transportation device 116 is configured to transfer nose portion 306 and/or tail portion 316 of fuselage 302 from fourth manufacturing zone 80 to second manufacturing zone 40.

Manufacturing zones 12 additionally or alternatively include one or more doorways 16 that are configured to permit entry and/or exit of constituent parts 200 into and/or out of manufacturing zones 12. One or more doorways 16 also may be referred to or described as gates, portals, entrances, exits, throughways, transfer locations, ingresses, and/or egresses. In some examples, one or more buildings 14 include the one or more doorways. Constituent parts 200 include base parts 202 and subassembly parts 204. In some examples, one or more doorways 16 are configured to receive base parts 202. Base parts 202 are constituent parts that are manufactured or otherwise procured from outside of aircraft manufacturing systems 10 (and thus may include one or more of raw materials, pre-fabricated parts, fasteners, tools, etc.) and that are brought into the manufacturing zones by the transportation devices. Thus, work processes in the manufacturing zones begin by adding to, subtracting from, and/or otherwise modifying the base parts; the base parts are the elementary constituent parts (e.g., the inputs) to the manufacturing zones. Subassembly parts 204 are an assembly of two or more base parts 202 that are assembled on one or more of the feeder lines and that are introduced to one or more of the assembly lines via the one or more of the feeder lines. In some such examples, third manufacturing zone 60 includes one or more doorways 16 that are configured to receive one or more of first aircraft subassembly 38, second aircraft subassembly 58, and/or third aircraft subassembly 98.

Subassembly parts 204 may include precursors 206 to one or more of the aircraft subassemblies, also referred to herein as aircraft subassembly precursors 206. The aircraft subassembly precursors comprise the structures on assembly lines 120 that advance along assembly lines 120 and eventually become the outputs of the manufacturing zones, once the work processes in the manufacturing zones are completed. For example, the precursors may be the structures to which constituent parts from feeder lines 140 are added. Thus, the aircraft subassembly precursors may be the structures on the main stem of the assembly lines 120 (the common assembly line that eventually produces the final output of the manufacturing zone in which it is included) that advance towards the end of the assembly lines 120 and become the final output of the manufacturing zones. For example, the precursor of the first manufacturing zone may be a wing precursor. The wing precursor advances along the assembly line of the first manufacturing zone and may take different shapes, structures, and/or properties as it advances along the assembly line and is added to, subtracted from, changed, processed, and/or otherwise worked on. Thus, precursors 206 are illustrated in FIG. 1 with dash-dot lines to reflect the fact that the shape, size, structure, composition, characteristics, and/or other properties of the precursors may change as the precursors travel down assembly lines 120. The precursor may eventually be transformed to the final output (i.e. it may eventually become a completed left side wing or right side wing) once all of the work processes in the first manufacturing zone have been performed on the precursor. Thus, the precursor is just an incomplete and/or partial version of a final output of the manufacturing zones.

In some such examples, the manufacturing zones include a sufficient number of the doorways such that each of the one or more doorways is configured to receive a unique constituent part and/or a unique set of constituent parts. That is, different constituent parts may be delivered to different doorways. Thus, including more doorways along the manufacturing zones enables constituent parts to be delivered closer to their point of consumption, assembly, and/or use in the manufacturing zones. Further, delivering parts to their final destinations from a plurality of origins (e.g., doorways) streamlines the delivery process, reduces congestion, and mitigates bottlenecks in the delivery process. In this way, constituent parts may be delivered to their final destination in a more efficient manner than conventional delivery approaches that deliver parts to various places in a manufacturing zone from a single source/origin (e.g., doorway).

Additionally or alternatively, one or more doorways 16 are configured to receive and/or convey constituent parts 200 between manufacturing zones 12. As an example, fourth manufacturing zone 80 and second manufacturing zone 40 include one or more doorways 16 that are configured to permit constituent parts 200 to be transferred from fourth manufacturing zone 80 to second manufacturing zone 40. As discussed above, in some such examples, transportation device 100 also is included between fourth manufacturing zone 80 and second manufacturing zone 40, and is configured to transport the constituent part between fourth manufacturing zone 80 and second manufacturing zone 40. As an example, transportation device 100 is configured to transfer at least a portion of fuselage 302 from fourth manufacturing zone 80 to second manufacturing zone 40. As one such example, transportation device 100 is configured to transfer nose portion 306 and/or tail portion 316 of fuselage 302 from fourth manufacturing zone 80 to second manufacturing zone 40. Additionally or alternatively, one or more doorways 16 are configured to discharge the outputs of manufacturing zones 12 from the manufacturing zones. As an example, one or more of first manufacturing zone 20 includes one or more doorways 16 that is/are configured to discharge first aircraft subassembly 38, second manufacturing zone 40 includes one or more doorways 16 that is/are configured to discharge second aircraft subassembly 58, third manufacturing zone 60 includes one or more doorways 16 that is/are configured to discharge aircraft assembly 78, and/or fourth manufacturing zone 80 includes one or more doorways 16 that is/are configured to discharge third aircraft subassembly 98. As an example, one or more of the doorways is/are configured to discharge nose portion 306 and/or tail portion 316 of fuselage 302 to second manufacturing zone 40 and/or one or more different doorways is/are configured to discharge wing fuselage section 310 to third manufacturing zone 60.

In some examples, base parts 202 are delivered to manufacturing zones 12 via pathways 18. When included, pathways 18 are configured to permit delivery of base parts 202 to manufacturing zones 12 from outside of aircraft manufacturing systems 10 or at least from outside of a manufacturing zone 12 thereof. As an example, pathways 18 are configured to permit travel of transportation devices 100, which in turn are configured to carry base parts 202 of aircraft assembly 78. In some examples, pathways 18 extend around at least a portion of manufacturing zones 12. In particular, pathways 18 are configured to permit the travel of transportation devices 100 around at least a portion of the manufacturing zones. In such examples, pathways 18 extend around at least a portion of a perimeter of one or more of first manufacturing zone 20, second manufacturing zone 40, third manufacturing zone 60, and/or fourth manufacturing zone 80. In some such examples, pathways 18 extend to one or more doorways 16 and permit transportation devices 100 to travel directly to one or more doorways 16, and therefore deliver constituent parts 200 directly to the one or more doorways. As an example, when transportation devices 100 include land-based vehicles, (e.g., trucks, vans, buses, shuttles, trains, etc.) pathways 18 include roads or other suitable surfaces that are configured to permit travel of these land-based vehicles. In some examples, pathways 18 are configured to be one-way pathways that limit travel of the transportation devices 100 to one direction.

In some examples, one or more of manufacturing zones 12 include assembly lines 120. When included, assembly lines 120 include a series of workstations that are configured to perform work on constituent parts 200 of the aircraft assembly 78. Assembly lines 120 are configured to guide constituent parts 200 through the series of workstations along a one-way path that constitutes at least a portion of one or more of manufacturing zones 12. In this way, work is performed on the constituent parts at various locations (e.g., workstations) on assembly lines 120.

In some examples, assembly lines 120 include a drive mechanism 122 (e.g., electric motor) that is configured to propel the constituent parts down assembly lines 120. In some such examples, drive mechanism 122 is configured to propel a mechanical linkage 124 (e.g., one or more of belt, chain, pulley, cable, and/or platform) that is configured to maintain contact with one or more of the constituent parts (e.g., via frictional forces and/or magnetic forces) as it moves, and thus propel the constituent parts through at least a portion of manufacturing zones 12. In some further such examples, assembly lines 120 include a conveyor system driven by drive mechanism 122, such as one or more of a belt conveyer system, roller conveyor, belt conveyor, chain conveyor, cable conveyor, etc. However, in other examples, drive mechanism 122 includes a motorized vehicle such as an aircraft tug.

Assembly lines 120 include one or more of a first assembly line 130, a second assembly line 132, and a third assembly line 134, in some examples. When included, first assembly line 130 is included in first manufacturing zone 20 and is configured to propel constituent parts 200 of first aircraft subassembly 38 and/or first aircraft subassembly 38 through at least a portion of first manufacturing zone 20. When included, second assembly line 132 is included in second manufacturing zone 40 and is configured to propel constituent parts 200 of second aircraft subassembly 58 and/or second aircraft subassembly 58 through at least a portion of second manufacturing zone 40. When included, third assembly line 134 is included in third manufacturing zone 60 and is configured to propel constituent parts 200 of aircraft assembly 78 and/or aircraft assembly 78 through at least a portion of third manufacturing zone 60. Although three assembly lines 120 are illustrated in FIG. 1 (one in each of the first, second, and third manufacturing zones), it should be appreciated that, in other examples, each of the manufacturing zones may include more or less than one assembly line 120. Further, each assembly line 120 may include one or more subassembly lines. For examples, one or more of the assembly lines may include one or more main assembly lines and one or more tributary assembly lines (e.g., feeder lines 140) that branch off from larger, main assembly lines. The assembly lines 120 may branch into increasingly smaller subassembly lines, in some examples. Thus, each of the assembly lines may include a network of tributary assembly lines that eventually feed into a common assembly line. In this way, assembly lines 120 may branch off into one or more subassembly lines and/or may join together to form one or more common assembly lines.

In some examples, when included, fourth manufacturing zone 80 does not include assembly lines 120. However, in other examples, fourth manufacturing zone 80 does include one or more assembly lines 120. Regardless, fourth manufacturing zone 80 includes stationary bays 84 (also referred to herein as parking spaces 84 and/or hangars 84) that are configured to perform multiple work processes, one at a time (i.e., in series), on constituent parts 200. Stationary bays 84 are configured to hold constituent parts 200 for a longer duration than workstations of assembly lines 120. In some examples, different stationary bays 84 are configured to manufacture different parts. As an example, one of stationary bays 84 is configured to manufacture at least a portion of wing fuselage section 310, another one of stationary bays 84 is configured to manufacture tail portion 316 of fuselage 302, and another one of stationary bays 84 is configured to manufacture nose portion 306 of fuselage 302. In some examples, stationary bays 84 are configured to produce third aircraft subassembly 98.

Manufacturing zones 12 additionally include feeder lines 140, in some examples. When included, feeder lines 140 are configured to introduce base parts 202 and/or subassembly parts 204 to assembly lines 120. As an example, feeder lines 140 are configured to transfer base parts 202 and/or subassembly parts 204 from doorways 16 to assembly lines 120. In particular, feeder lines 140 may join with one or more of the assembly lines to deliver base parts 202 and/or subassembly parts 204 thereto. In some examples, assembly lines 120 include feeder lines 140. In such examples, feeder lines 140 may be subassembly lines (also referred to herein as tributary assembly lines) of assembly lines 120. In other examples, feeder lines 140 may be separate and distinct from assembly lines 120. As with assembly lines 120, feeder lines 140 may include one or more sub-feeder lines that branch off one or more main feeder lines. That is the feeder lines may include a network of tributary feeder lines that eventually feed into a main feeder line.

Additionally or alternatively, the feeder lines are configured to orient the base parts and/or subassembly parts in a final orientation. The final orientation is the orientation in which the base parts and/or subassembly parts are coupled to the structure (e.g., aircraft subassembly precursor 206) on the assembly line. In some examples, doorways 16 are configured to receive the parts in their final orientation. Additionally or alternatively, the feeder lines themselves are configured to orient the parts in their final orientation after the parts have been loaded onto the feeder lines. Thus, the orientation of the base parts and/or subassembly parts may not need to be rotated, pivoted, or otherwise changed by the robots, machines, and/or workers when assembling or coupling the base parts and/or subassembly parts to the larger aircraft structure (e.g., aircraft subassembly precursor 206) on the assembly line. Thus, by providing the base parts and/or subassembly parts to the feeder lines and/or the assembly lines in their final orientation, production inefficiencies within the manufacturing zones may be reduced.

In some examples, the feeder lines include fractional pulse assembly lines that are configured to fractionally pulse base parts 202 and/or subassembly parts 204 to assembly lines 120. As an example, the feeder lines include fractional pulse assembly lines 126.

Additionally or alternatively, the feeder lines include more than one fractional pulse assembly line and/or include a main feeder line and one or more sub-feeder lines that are configured to deliver constituent parts to the main feeder line. In this way, the feeder lines may branch into increasingly smaller upstream feeder lines. Thus, the manufacturing zones 12 may each include one or more of the assembly lines, and each of the assembly lines may branch into increasingly smaller feeder lines. In this way, the manufacturing zones 12 may include a network of tributary assembly lines that eventually all feed into third manufacturing zone 60.

In some examples, base parts 202 are delivered to manufacturing zones 12 by transportation devices 100 via pathways 18, enter manufacturing zones 12 via doorways 16, and then are ferried to assembly lines 120 via feeder lines 140. In some examples, feeder lines 140 include the same or similar devices of assembly lines 120 (e.g., conveyor systems). In some examples, the subassembly parts 204 are manufactured on the feeder lines 140 and/or are a product/output of the feeder lines 140. In such examples, the transportation devices 100 may deliver base parts 202 to the feeder lines 140, and the subassembly parts may be manufactured on the feeder lines from these base parts.

By including the pathways, the one or more doorways, and/or the feeder lines, constituent parts may be delivered closer to their point of assembly on the assembly lines. Further, feeding constituent parts to the assembly lines from a plurality of feeder lines, as opposed to a common dock, reduces queue wait times and/or other constituent part delivery inefficiencies, thereby increasing production rates.

In some examples, different doorways are configured to receive constituent parts in the order in which they are assembled on the assembly line. As an example, a first door may receive a first constituent part and an adjacent second door may receive a second constituent part that is configured to be assembled directly after the first constituent part. For example, fuselage frames may be installed before windows and/or window frames on a fuselage skin, and thus, the fuselage frames may be delivered to a different doorway than the windows and/or window frames. Further, the fuselage frames may be fed to a more upstream position of the assembly line than the windows and/or window frames via one of the feeder lines.

In some examples, assembly lines 120 include fractional pulse assembly lines 126. When included, fractional pulse assembly lines 126 are configured to pulse (i.e., periodically move) constituent parts by only a fraction of a length of the constituent parts 200 (i.e., by less than the length of the constituent parts 200) in the direction of movement. Thus, unlike conventional pulsed assembly lines in which constituent parts 200 are pulsed to an entirely different, non-overlapping location where a new workstation is located (e.g., pulsed by more than their length), fractional pulse assembly lines 126 micro-pulse the constituent parts to an overlapping position that still includes at least one or more of the workstations from the previous position. Further, unlike conventional pulsed assembly lines in which work is performed on a given constituent part by one workstation at a time (i.e., different workstations perform work on a constituent part serially), multiple workstations of fractional pulse assembly lines 126 are configured to perform work on the constituent parts in parallel (i.e., simultaneously). Because fractional pulse assembly lines 126 pulse constituent parts 200 by less than their length, a given workstation serially performs work on different sections of a given constituent part since the constituent part is fractionally pulsed past the workstation in multiple pulses. That is, unlike conventional pulsed assembly lines in which a constituent part enters a workstation on a first pulse and exits the workstation on an immediately next, second pulse, fractional pulse assembly lines 126 of the present disclosure utilize more than two pulses for a constituent part to both enter and exit the workstation.

In some examples, two or more of first manufacturing zone 20, second manufacturing zone 40, and fourth manufacturing zone 80 when included, produce first aircraft subassembly 38, second aircraft subassembly 58, and third aircraft subassembly 98, respectively, at least at substantially the same rate (e.g., production times for the aircraft subassemblies are within 5% of one another), such that the aircraft subassemblies are provided to third manufacturing zone 60 at approximately the same time (i.e., just in time). In some such examples, base parts 202 are provided to first manufacturing zone 20, second manufacturing zone 40, and fourth manufacturing zone 80 when included, at approximately the same time. In some further such examples, where first manufacturing zone 20 and second manufacturing zone 40 include assembly lines of substantially the same length (e.g., within 5% of the length of one another) the average velocity of the assembly lines is substantially the same (e.g., within 5% of one another).

Turning to FIGS. 2-3, they illustrate example fractional pulse assembly lines 400 of fractional pulse assembly lines 126. Fractional pulse assembly lines 126 may be included in assembly lines 120, feeder lines 140, and/or other assembly lines of aircraft manufacturing systems 10. The fractional pulse assembly lines 126 include workstations that are configured to perform work on constituent parts pulsed by the fractional pulse assembly lines. Further, the workstations may include a powered mechanism (e.g., conveyor system) that is configured to move (e.g., fractionally pulse) the constituent parts along the assembly lines. The distance between the centerlines of adjacent workstations on the fractional pulse assembly lines may be referred to herein as the workstation pitch. The number of workstations per unit length on the assembly line may be referred to as the workstation density or workstation packing density.

FIG. 2 provides graphs comparing fractional pulse assembly lines 126 of the present disclosure to conventional pulsed assembly lines. In particular, graph 450 shows an example conventional pulsed assembly line 440, while graphs 452 and 454 show example fractional pulse assembly lines 400 according to the present disclosure. Unlike conventional pulsed assembly line 440 in which constituent parts 200 are pulsed by more than their length between workstations 410, constituent parts 200 of the present disclosure are pulsed by less than their length between workstations 410. In particular, in conventional pulsed assembly line 440, constituent parts 200 are pulsed from a first workstation 412 to a second workstation 414, whereas in fractional pulse assembly lines 126 of the present disclosure, constituent part 200 is pulsed by less than its length from first workstation 412 to second workstation 414. Thus, the workstations are smaller and/or closer together in the present disclosure than in conventional pulsed assembly line 440 for comparably sized constituent parts. Stated slightly differently, the assembly lines of the present disclosure have a higher workstation packing density than conventional assembly lines. In this way, more work may be performed on a part at any given time because more workstations may have access to the part at any given time. Further, because the workstations may be packed more densely together, the total footprint (area) of the manufacturing system may be reduced. Graph 452 illustrates an example where one of constituent parts 200 is pulsed by one third of its length during each pulse, and graph 454 illustrates an example where one of constituent parts 200 is pulsed by one ninth of its length during each pulse.

As illustrated, the workstations become smaller and/or closer together (i.e., the pitch of the workstations decreases) as the pulse length (e.g., the distance constituent parts 200 move during a pulse) is shortened. Additionally or alternatively, a pulse frequency increases when the pulse length decreases. That is, there is less time between pulses when the pulse length is shortened because more pulses are needed to propel the constituent parts 200 the same distance. As illustrated in the example of FIG. 2, constituent parts 200 in graph 454 are pulsed more frequently than constituent parts 200 in graph 452 since constituent parts in graph 452 are pulsed farther than in graph 454. Shorter pulse lengths and smaller workstations enable more workstations to simultaneously perform work on constituent parts 200 (i.e., the workstation packing density is increased). Increasing the amount of parallel processing of constituent parts 200 in this way increases production efficiencies and reduces production times. The minimum size of the workstations is limited by a variety of factors including one or more of a uniformity of constituent parts 200 along a length of the constituent parts, an amount of similarity in the work process to be performed on the constituent parts along the length of the constituent part, an order of the work processes, a delay between work processes, and/or a size of the machines, robots, tools, and/or workers needed to perform the work processes at the workstations.

In some examples, first workstation 412 and second workstation 414 perform different work processes on constituent parts 200. Additionally or alternatively, different tools, robots, and/or workers perform work on constituent parts 200 at first workstation 412 and second workstation 414. A work process includes one or more of adding to (e.g., coupling two or more base parts 202 together, coupling a subassembly part 204 to a base part 202, coupling a base part 202 and/or a subassembly part 204 to one of aircraft subassembly precursors 206, coupling two or more subassembly parts 204 together, etc.), subtracting from (e.g., drilling holes in), and/or otherwise modifying (e.g., re-forming, re-shaping, bending, curing, sterilizing, treating, heating, cooling, pressurizing, etc.) constituent parts 200. Thus, performing a work process includes performing work on one or more of constituent parts 200.

As illustrated in FIG. 3, workstations 410 (also referred to herein as assembly line workstations 410) each include a work-performing device 420 that is configured to perform the work processes (i.e., to perform work on constituent parts 200). As examples, work-performing device 420 includes one or more of a robot 422, a machine 424, a human worker 426, and/or a tool 428. Robot 422 is an autonomous device that is configured to perform work without human input and/or intervention. Machine 424 is a relatively large device that is configured to perform work based on human input. As examples, machine 424 may be a machine tool, such as a press, a mill, a lathe, etc. Tool 428 is smaller than machine 424 and is configured to perform work based on human input. As an example, tool 428 may be a hand-held device.

In some examples, two or more of the workstations perform different work processes on constituent parts 200. In some such examples, each of the workstations performs a unique type of work process on the constituent parts, such that all of the workstations perform different work processes on the constituent parts. Additionally or alternatively, in some examples, each of the workstations performs only one type of work process on the constituent parts (e.g., only drilling holes, only cutting out windows, only installing frames, only installing stringers, only installing sealant, etc.). Thus, in such examples, each workstation performs only one type of work process that is unique to that particular workstation.

Additionally or alternatively, in some examples, two or more of the workstations include different types of work-performing devices 420 that are configured to perform different types of work processes. In some such examples, each of the workstations includes a unique type of work-performing devices 420 and/or a unique combination of work-performing devices 420, such that all of the workstations are configured to perform different types of work processes. In some such examples, each workstation only includes one work-performing device 420 and/or one type of work-performing device.

As an example, a portion of a fractional pulse assembly line includes at least seven workstations located at various serial positions along the assembly line that perform their own unique work process. In some such examples, the at least seven workstations are divided into a first set of workstations that installs fuselage frames and a second set of workstations, positioned downstream of the first set of workstations, that installs window frames. Thus, in such examples, the fuselage frames are installed first, and then the window frames. The fuselage frames may be installed first to increase the structural integrity of the fuselage skin prior to window installation. In some such examples, installing the fuselage frames and the window frames includes drilling holes for fasteners, laying up the window frames and/or fuselage frames with temporary fasteners, and then installing the fasteners.

As examples, the most upstream workstation of the first set of workstations (the fuselage frame installing workstations) drills holes on the skin for the fuselage frame fasteners, the next workstation (the adjacently positioned downstream workstation) lays up the fuselage frame on the skin with temporary fasteners, and then a third workstation installs the permanent fasteners. Two of the most upstream workstations of the second set of workstations (the window frame installing workstations) drill holes in the fuselage skin for the window frame fasteners and cut out the window openings in the skin. Downstream workstations of the second set of workstations lay up the window frames with temporary fasteners and then install the permanent fasteners in the window frames.

In this way, each workstation 410 and/or each work-performing device 420 may perform the same work process over and over again on the various sections of the constituent parts. That is, by breaking the constituent parts down into sections and configuring the workstations to only perform work on one section at a time, each workstation and/or work-performing device may be simplified such that the workstation and/or work-performing device repeatedly performs the same work and/or only performs one type of work. Not only may the workstations and/or work-performing devices be configured to perform the same type of work, but the workstations and/or work-performing devices also may be configured to perform the same type of work on the same location of each section of the constituent parts. As an example, a given workstation that is configured to drill holes in a fuselage skin also may be configured to drill these holes in the same position on each section of the fuselage skin (i.e., all of the sections may include the same number of holes, the same positioning of the holes, and/or same hole configuration/pattern). Thus, the work-performing device may not need to move at all and/or may move in the same manner after each pulse when drilling the holes in the different sections of the fuselage skin as the sections are fractionally pulsed past the workstation. In this way, the work-performing devices themselves and/or the programming thereof may be simplified as compared to conventional assembly lines approaches.

In this way, by performing only one type of work process, the size, complexity, and/or cost of the work-performing devices may be reduced as compared to conventional work-performing devices that are configured to perform multiple types of work processes. Further, by fractionally pulsing the constituent parts and dividing the work processes into smaller work areas, the amount of movement needed to perform the work processes may be reduced, thereby further reducing the size, complexity, and cost of the work-performing devices.

In the example of FIG. 3, six workstations 410 are illustrated. However, in other examples, more or less than six workstations 410 are included in example fractional pulse assembly lines 400. Although workstations 410 are only illustrated along one side of the components, the workstations may be positioned along both sides of the components. Further, the example fractional pulse assembly line shown in FIG. 3 is only a portion of fractional pulse assembly lines 126, in some examples. In some such examples, fractional pulse assembly lines 126 include two or more of example fractional pulse assembly lines 400.

In some examples, fractional pulse assembly lines 400 include an assembly area 430 where sub-components 404 are configured to be assembled to form components 406. Additionally or alternatively, components 406 enter a queue 434 where work is not configured to be performed on the components. Components 406 are fractionally pulsed through the workstations, and work is performed on the components by each work-performing device 420. In some examples, subassembly parts 204 and/or base parts 202 are added to components 406 at one or more of workstations 410. After exiting workstations 410, components 406 enter another assembly area 430, in some examples, and are assembled together to become sub-components of a new component.

In some examples, constituent parts 200 having different physical properties are pulsed down the same fractional pulse assembly line, and/or workstations 410 perform work on constituent parts 200 having different physical properties, such as one or more of shape, geometry, size, weight, surface features, etc. As an example, components 406 include a first component 407 and a second component 408 comprising different physical properties. As one such example, first component 407 is longer than second component 408, as illustrated in FIG. 3. Thus, in such examples, constituent parts of different lengths are pulsed down the same fractional pulse assembly line.

Additionally or alternatively, FIG. 3 illustrates how workstations 410 are not all the same length, in some examples. In some such examples, the lengths of workstations 410 are multiples of another. For example, in FIG. 3, the longer workstation is twice the length of the other workstations. However, in other examples, the lengths of workstations 410 are not exact integer multiples (e.g., twice, three times, four times, etc.) of the lengths of other workstations. In some examples, constituent parts 200 are pulsed by an amount equal to the shortest workstation of workstations 410 (i.e., a minimum workstation length).

A pulse length 460 is a distance travelled by constituent parts 402 during a pulse. As discussed above, the pulse length in fractional pulse assembly lines 126 of the present disclosure is less than a length of the constituent parts. Thus, in the example of FIG. 3, the pulse length is equal to one third of the length of first component 407 and one half of the length of second component 408. A work period 464 is the duration between pulses, during which constituent parts 402 are stationary and/or work is configured to be performed on constituent parts 402. In other words, work period 464 is the duration between the end of a pulse and the beginning of a subsequent pulse. A pulse duration 466 is the time it takes to complete a pulse, that is, to move constituent parts 402 the entire pulse length to a new position on fractional pulse assembly lines 126. A pulse period 462 is equal to a full fractional pulse cycle: the work period plus the pulse duration.

In some examples, a length of the constituent parts is an integer multiple of the pulse length. As examples, constituent parts 200 are two, three, four, five, six, seven, eight, nine, ten, eleven, twelve, thirteen, fourteen, fifteen, sixteen, seventeen, eighteen, nineteen, and/or twenty times the length of the pulse length. Thus, in such examples, the pulse length is equal to 1/X of the length of constituent parts 200, where X is an integer value. As discussed above, in some such examples, the pulse length is equal to the length of the shortest workstation(s) of workstations 410 (i.e., a minimum workstation length), and thus, the shortest workstation(s) of workstations 410 also is equal to 1/X of the length of constituent parts 200, where X is an integer value.

In some examples, a given work process (e.g., drilling holes) may be performed in the same manner at regular intervals along the length of the constituent part. For example, Y number of vertically aligned holes (e.g., five holes) may be drilled in an aircraft skin every X meters (e.g., every 1 m). Thus, in some such examples, the five holes may be drilled in the aircraft skin at one meter intervals. In some further such examples, the regular intervals of a given work process may be equal to the pulse length. Thus, in the above example, the pulse length may be one meter, such that the work-performing device does not have to move to drill holes on the next section of the constituent part. In some examples, the workstations on a fractional pulse assembly line are chosen based on the regular intervals of the work processes they perform. In some examples, workstations may be selected that have the same regular intervals, and/or integer multiples thereof, so that the pulse length does not have to be changed and/or so that the work-performing devices do not have to move laterally as much between pulses to perform the work process on different sections.

As an example, a constituent part may be configured to include windows every X meter, frames every X meter, and a column of vertical holes every X/Y meter. A first workstation may be configured to cut out the window opening, a second workstation may be configured to install the frames, and a third workstation may be configured to drill the holes. In some such examples where X=1 meter, Y=2 meters and the pulse length=0.5 meters, the third workstation performs its work process (drills a vertical column of holes) after every pulse. However, the first and second workstations only perform their work processes after every second pulse (every other pulse), since their work processes only need to be performed at 1 meter intervals (equal to two pulse lengths). In another such example where X=1 meter and Y=2 meters, but where the pulse length=1 meter, the third workstation must drill two columns of vertical holes after each pulse, and the first and second workstation perform their work processes (cut out a window opening and install a frame) once after each pulse.

However, in other examples, X is not an integer value and the length of constituent parts 200 is not equal to an integer multiple of the pulse length.

FIGS. 4-6 schematically provide flowcharts that represent illustrative, non-exclusive examples of methods according to the present disclosure. In FIGS. 4-6, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 4-6 are not limiting and other methods and steps are within the scope of the present disclosure, including methods having greater than or fewer than the number of steps illustrated, as understood from the discussions herein. Further steps from different methods and/or different figures may be combined.

FIGS. 4-6 illustrate example methods according the present disclosure. In particular, FIG. 4 illustrates methods 500 for manufacturing aircraft assemblies (e.g., aircraft assembly 78), such as aircraft (e.g., aircraft 300), according to the present disclosure, FIG. 5 illustrates methods 600 for fractionally pulsing constituent parts (e.g., constituent parts 200) down a fractional pulse assembly line (e.g., fractional pulse assembly lines 126), and FIG. 6 illustrates methods 700 for designing and/or constructing aircraft manufacturing systems (e.g., aircraft manufacturing systems 10) of the present disclosure. With this scope of the present disclosure are methods that include steps from more than one of methods 500, methods 600, and/or methods 700, as understood from the discussions herein.

Methods 500 include manufacturing (or assembling) aircraft subassemblies (e.g., first aircraft subassembly 38, second aircraft subassembly 58, and/or third aircraft subassembly 98) in parallel in the same geographic region and/or on separate assembly lines (e.g., assembly lines 120) at 502. For example, the manufacturing at 502 may comprise sending one or more of the first aircraft subassemblies 38 and constituent parts 200 thereof down a first assembly line 130 and sending one or more of the second aircraft subassemblies 58 and constituent parts 200 thereof down a second assembly line 132, which assembly lines may be fractional pulse assembly lines, as discussed herein. As discussed above, manufacturing in the same geographic region comprises manufacturing the aircraft subassemblies in manufacturing zones (e.g., manufacturing zones 12) that are separated by at most 3 km, at most 2 km, at most 1 km, at most 0.75 km at most 0.5 km, at most 0.3 km, at most 0.2 km, at most 0.1 km, at most 75 m, at most 50 m, and/or at most 25 m. Thus, in such examples, manufacturing at 502 includes manufacturing the aircraft subassemblies in different manufacturing zones. As one such example, the manufacturing includes manufacturing the first aircraft subassembly in a first manufacturing zone (e.g., first manufacturing zone 20) and manufacturing the second aircraft subassembly in a second manufacturing zone (e.g., second manufacturing zone 40). In some examples, manufacturing the aircraft subassemblies on separate assembly lines comprises manufacturing the first aircraft subassembly at least partially on a first assembly line (e.g., first assembly line 130) and manufacturing the second aircraft subassembly at least partially on a second assembly line (e.g., second assembly line 132). In some such examples, the first assembly line is included in the first manufacturing zone and the second assembly line is included in the second manufacturing zone.

Manufacturing the aircraft subassemblies at 502 comprises manufacturing the aircraft subassemblies at the same rate such that they are produced and transferred to the third manufacturing zone at approximately the same time. When manufacturing the first aircraft subassembly and the second aircraft subassembly on the first and second assembly lines, methods 500 optionally include advancing the first aircraft subassemblies on the first assembly line and the second aircraft subassemblies on the second assembly line at the same average velocity to achieve the same production rate and provide the aircraft subassemblies to the third manufacturing zone at approximately the same time.

As already discussed above, manufacturing constituent parts in the same geographic region reduces assembly delays and increases production rates. In particular, by manufacturing the constituent parts in the same geographic region, aircraft subassemblies may be delivered to the final assembly facility (e.g., third manufacturing zone) more concurrently (i.e., just in time) and/or more reliably, thereby enabling assembly to begin more immediately and/or more frequently. In this way, final assembly of the aircraft assembly is not subject to unexpected delays (e.g., third party manufacturer delays, shipping delays, etc.). The entire production of the aircraft assembly may be more streamlined and consistent, and down time may be reduced.

Manufacturing at 502 optionally includes manufacturing (or assembling) the aircraft subassemblies at least partially on fractional pulse assembly lines (e.g., fractional pulse assembly lines 126) at 504. In some such examples, the assembly lines include the fractional pulse assembly lines. Methods 600 illustrated in FIG. 5 provide examples for fractionally pulsing constituent parts (e.g., constituent parts 200) of the aircraft assemblies. Thus, in some examples, at least a portion of methods 600 are performed at 504 of methods 500. Additionally or alternatively, manufacturing at 502 optionally includes providing base parts (e.g., base parts 202) to the manufacturing zones at 506. As discussed above, the providing includes delivering the base parts to the manufacturing zones via transportation devices (e.g., transportation devices 100), such as land-based vehicles (e.g., trucks, vans, buses, trains), in some examples. The providing base parts to the manufacturing zones at 506 may include providing the base parts to assembly lines (e.g., assembly lines 120) and/or to feeder lines (e.g., feeder lines 140). As discussed above, the feeder lines include drive mechanisms (e.g., drive mechanism 122) that propel the parts down the feeder lines, towards the assembly lines. Optionally at 512, methods 500 include manufacturing the aircraft subassemblies in separate buildings (e.g., buildings 14). As an example, the first manufacturing zone and the second manufacturing zone are included in different buildings that are physically separated from one another, and manufacturing the aircraft subassemblies in these two manufacturing zones includes manufacturing the aircraft subassemblies in different buildings.

In some examples, methods 500 include producing different types of constituent parts in their final orientation and/or delivering these different types of constituent parts to the third manufacturing zone in this final orientation. As an example, first assembly line is configured to deliver the left side wing in a final left side wing orientation to the third manufacturing zone and deliver the right side wing in a final right side wing orientation to the final assembly facility (e.g., third manufacturing zone). The left side wing is configured to be coupled to the fuselage in the final left side wing orientation, and the right side wing is configured to be coupled to the fuselage in the final right side wing orientation. In this way, the wing may not need to be rotated or pivoted in the third manufacturing zone and/or when transferring the wings to the third manufacturing zone. The wings may be output by the first manufacturing zone in their final orientation, so that further manipulation is not required before final assembly.

Methods 500 include combining the aircraft subassemblies in the same geographic region at 520. As an example, combining at 520 includes assembling the aircraft subassemblies in a third manufacturing zone (e.g., third manufacturing zone 60), that is in the same geographic region as the first manufacturing zone and the second manufacturing zone, to form the aircraft assembly. Optionally, combining at 522 includes transferring the aircraft subassemblies to the third manufacturing zone. As an example, the transferring includes moving the aircraft subassemblies from one or more of the first manufacturing zone, the second manufacturing zone, and/or a fourth manufacturing zone (e.g., fourth manufacturing zone 80) to the third manufacturing zone via one or more transportation devices. As just one such example, and as already described above, the transferring includes hoisting the first aircraft subassembly with a crane from the first manufacturing zone to the third manufacturing zone.

In some examples, methods 500 optionally include pulsing the aircraft subassemblies and/or the aircraft assembly through the third manufacturing zone down a third assembly line (e.g., third assembly line 134) at 524. In some such examples, the pulsing includes fractionally pulsing the aircraft subassemblies and/or the aircraft assembly in a similar manner to that described at 504.

FIG. 6 illustrates methods 600 for fractionally pulsing one or more constituent parts of the aircraft assembly, and thus methods 600 also may be described as methods for repetitively manufacturing aircraft. The methods 600 and/or portions thereof may be used to fractionally pulse constituent parts of the aircraft assembly at various locations in a manufacturing system (e.g., aircraft manufacturing systems 10). Thus, although the methods 600 may be utilized to fractionally pulse constituent parts along a main assembly line (e.g., assembly lines 120), the methods 600 may additionally or alternatively be utilized to fractionally pulse constituent parts along tributary assembly lines, such as subassembly lines, towards the main assembly line, feeder lines (e.g., feeder lines 140) towards the main assembly lines and/or along sub-feeder lines towards the feeder lines. Thus, the fractional pulse assembly lines may be configured to pulse an aircraft assembly (e.g., aircraft assembly 78), aircraft subassemblies (e.g., first aircraft subassembly 38, second aircraft subassembly 58, etc.) and/or sub-components, sub-structures, and constituent parts thereof. Further, the methods 600 may be utilized to fractionally pulse the aircraft assembly and/or aircraft subassemblies in a final assembly zone (e.g., third manufacturing zone 60).

At 602, methods 600 optionally include placing one or more constituent parts (e.g., sub-components 404, base parts 202, and/or subassembly parts 204) on the same and/or different fractional pulse assembly line(s). At 604, methods 600 include fractionally pulsing the one or more constituent parts down the same and/or different fractional pulse assembly line(s). In some examples, the fractionally pulsing comprises propelling the one or more constituent parts with a drive mechanism (e.g., drive mechanism 122). The fractional pulsing comprises periodically pulsing (pulsing one or more constituent parts and then waiting a duration before pulsing the one or more constituent parts again) the one or more constituent parts down the assembly line(s) by less than a length of the one or more constituent parts. The pulsing itself comprises propelling, translating, and/or otherwise moving the one or more constituent parts down the assembly line(s) by less than a length of the one or more constituent parts during a single pulse. The waiting the duration comprises waiting a time interval. In some examples, the time interval comprises an amount of time needed to complete a work process on the one or more constituent parts.

Optionally at 605, the fractional pulsing includes fractionally pulsing (i.e., sending) different types of constituent parts in series down the same assembly line or feeder line and/or producing different types of constituent parts in series on the same assembly line or feeder line. As discussed in greater detail below, it may be determined that different types of components share enough similarities and/or their work processes share enough similarities, that they may be pulsed down the same assembly line or feeder line in series and/or produced on the same assembly line or feeder line. In some examples, different aircraft subassembly precursors may be pulsed down the same assembly line. As examples, left and right wings, and/or constituent parts thereof such as precursors of the left and right wings, may be pulsed down the same assembly line or feeder line and/or produced in series on the same assembly line or feeder line. As another example, different sections of a fuselage, and/or constituent parts thereof, may be pulsed down the same assembly line or feeder line and/or produced in series on the same assembly line or feeder line.

Different types of components are different from one another structurally, functionally, and/or physically (e.g., in shape, geometry, size, etc.). As examples, a left wing and a right wing are different types of components because their geometries are different (i.e., mirror images of one another). As another examples, different sections of fuselage (e.g., forward main cabin portion 308 vs. aft main cabin portion 314) are different types of components because they may be different shapes, sizes (e.g., lengths), may include different numbers of windows and/or different positions of the windows, etc. Thus, in some examples, a given assembly line produces two different types of constituent parts.

By producing and/or pulsing different types of components on the same line (assembly line or feeder line), the same work-performing devices may be utilized to produce the different types of components. This reduces the number of workers, robots, machines, and/or tools needed to produce the aircraft assemblies, and thus reduces the cost of the aircraft manufacturing systems. Further, even where different tools may be needed to produce the different types of components, the same workers may still be utilized to produce the different types of components, which reduces costs. At 606, methods 600 include simultaneously performing different work processes on different sections of the one or more constituent parts. The performing different work processes includes one or more of utilizing different work-performing devices (e.g., work-performing device 420) to perform the work, performing different types of work (e.g., drilling holes vs. painting vs. laminating vs. ablating vs. attaching constituent parts, etc.), and/or performing work on different areas of the same section of a given constituent part. In particular, the performing the different work processes on different sections of the one or more constituent parts includes performing different work processes at different workstations (e.g., workstations 410). In such examples, two or more of the workstations are configured to perform different types of work on a given constituent part simultaneously. Further, the two or more of the workstations are configured to be close enough together such that a given constituent part occupies the two or more of the workstations at the same time. Thus, the fractional pulsing of methods 600 includes occupying at least two workstations simultaneously with at least one of the one or more constituent parts and/or performing work on at least one of the one or more constituent parts simultaneously at least at two or more workstations.

By fractionally pulsing the one or more constituent parts and performing different work processes simultaneously on the one or more constituent parts, parallel processing may be increased, and production inefficiencies may be reduced. In particular, more work may be performed on the one or more constituent parts at any given time. Further, breaking the one or more constituent parts down into fractional sections reduces an amount of movement of the work-performing devices needed to complete the work processes. Such reduced movement increases production efficiency as well.

The performing work on the one or more constituent parts optionally includes removing material from the one or more constituent parts at 608, adding material to the one or more constituent parts at 610, and/or processing, cleaning, curing, and/or otherwise exposing the one or more constituent parts to external stimuli (e.g., changes in pressure, changes in temperature, electromagnetic radiation, etc.) at 612. In some examples, the adding material to the one or more constituent parts at 610 includes coupling a base part (e.g., base part 202) and/or subassembly part (e.g., subassembly part 204) to the one or more constituent parts. In particular, the base part and/or subassembly part may be coupled to an aircraft subassembly precursor (e.g., aircraft subassembly precursor 206). In some examples, the base part and/or subassembly part is introduced to the fractional pulse assembly line via one or more feeder lines, as discussed above in the description of methods 500 of FIG. 5. Optionally at 611, the adding material includes adding a part (e.g., base part) to the one or more of the constituent parts from one or more of the feeder lines.

Optionally at 614, methods 600 include removing the one or more constituent parts from the fractional pulse assembly line(s), and/or merging different assembly lines (e.g., two or more fractional pulse assembly lines) together at 615. The merging the different assembly lines may include joining the different assembly lines to form a common assembly line. Additionally or alternatively, the merging may include joining a tributary assembly line and/or subassembly line with a main assembly line.

Optionally at 616, methods 600 include combining the one or more constituent parts to form a constituent part assembly. Combining the one or more constituent parts at 616 includes coupling the one or more constituent parts together, in some examples. As one example, the combining may include combining a base part and/or a subassembly part with an aircraft subassembly precursor on a main assembly line. The coupling is achieved through the use of fasteners, adhesives, and/or other coupling mechanisms. In some examples, the methods 600 include one or more of placing the constituent part assembly back on the assembly line(s), fractionally pulsing the constituent part assembly down the assembly line(s), and/or fractionally pulsing the constituent part assembly down the common assembly line.

Thus, methods 600 may include assembling, coupling, and/or otherwise combining constituent parts together. In some examples, this may be done by taking the constituent parts of an assembly line, combining them, and then putting them back on the same assembly line or placing them on a different assembly line. In other examples, this assembling, coupling, and/or otherwise combining may be performed on the assembly line without having to take the constituent parts off the assembly line. In still further examples, constituent parts from a first assembly line (e.g., feeder lines 140) may be transferred to a second assembly line (e.g., assembly lines 120) and assembled, coupled, and/or otherwise combined with the parts from the second assembly line on the second assembly line. As an example, a smaller, sub-feeder assembly line may merge with a larger, main assembly line when constituent parts are to be attached to a larger base structure, such as the aircraft subassembly precursor (e.g., when wing flaps are to be attached to the rest of the wings). In some examples, the first assembly may merge and/or join with the second assembly line such that the constituent parts may be transferred to the second assembly line via the conveyor mechanism of the first assembly line.

In this way, aircraft subassemblies may be manufactured from base parts at least in part by fractionally pulsing the aircraft subassemblies and/or one or more of their constituent parts down one or more assembly lines and/or feeder lines.

FIG. 6 illustrates methods 700 for designing and/or constructing aircraft manufacturing systems of the present disclosure that include fractional pulse assembly lines. At 702, methods 700 include determining and/or back-calculating constituent part production rates (i.e., takt time) based on one or more of aircraft assembly (e.g., aircraft assembly 78) takt time, and the number of constituent parts. The aircraft assembly takt time is the customer demanded production rate (e.g., number of aircraft assemblies per unit time), which is effectively the production rate or frequency at which the aircraft assemblies are produced. For example, when one of the aircraft assembly (e.g., aircraft 300) is produced every four hours to meet customer demand, the takt time of the aircraft assembly is four hours. Based on the takt time of the aircraft assembly, the takt time for each of the types of constituent parts of the aircraft assembly is back-calculated based on the number of each type of constituent part. In particular, the back-calculating is iteratively performed backwards from component to sub-component, until the takt time for all of the constituent parts is calculated, in some examples. The more sub-components a component includes, the shorter the takt time for the sub-components. That is, when a component comprises two or more sub-components, the sub-components have a shorter takt time than the component's takt time to maintain the component's takt time. Continuing with the above aircraft assembly example, since the aircraft assembly includes two wings (a left side wing and a right side wing) the takt time for the wings must be less than the takt time for the aircraft assembly to maintain the takt time of the aircraft assembly since there are more wings than aircraft assemblies (e.g., a wing must be delivered to final assembly every two hours so that a full set of two wings is delivered every four hours).

At 703, methods 700 include determining how many assembly lines (e.g., fractional pulse assembly lines) to include in the aircraft manufacturing system. The determining at 703 may be based on the feasibility of manufacturing the constituent parts on an assembly line, the number of constituent parts to be produced, an amount of similarity between the constituent parts to be produced, and/or an amount of similarity in the work processes to be performed on the constituent parts to be produced. The number of assembly lines may be affected by the number of constituent parts for which it is actually feasible to manufacture using assembly lines. As an example, it may not be feasible to manufacture the third aircraft subassemblies on an assembly line because of their unique physical characteristics (geometry, shape, size, surface features, etc.), and/or because of the unique work processes to be performed on them and/or their constituent parts. Thus, the third aircraft subassemblies may be manufactured in stationary bays (e.g., stationary bays 84) and may not be manufactured on assembly lines.

Additionally or alternatively, the number of assembly lines to include in the aircraft manufacturing system may be affected by the number of constituent parts that are produced. As an example, since it may be feasible to manufacture both the first aircraft subassemblies and the second aircraft subassemblies on assembly lines, at least two assembly lines may be included, one assembly line (e.g., first assembly line 130) to manufacture the first aircraft subassemblies, and another assembly line (e.g., second assembly line 132) to manufacture the second aircraft subassemblies.

Additionally or alternatively, the number of assembly lines to include in the aircraft manufacturing system may be affected by an amount of similarity between the constituent parts to be produced, and/or an amount of similarity in the work processes to be performed on the constituent parts to be produced. This is because constituent parts that are similar enough in their physical characteristics and/or their work processes to be performed may, in some examples, be manufactured on the same assembly line. As described below at step 707 for example, left and right side wings may both be produced on the same assembly line (e.g., first assembly line 130). As another example, different sections of the fuselage may be similar enough that they may be produced on the same assembly line (e.g., second assembly line 132). Thus, in some examples, the aircraft manufacturing system includes two assembly lines, wherein each of the assembly lines is configured to produce two or more different types of constituent parts of the aircraft. In this way, when more of the constituent parts may be manufactured on the same assembly line, fewer assembly lines may be included in the aircraft manufacturing system.

At 704, methods 700 include determining the line lengths of the fractional pulse assembly lines of the aircraft manufacturing system based on one or more of the following line parameters. As an example, at 706, methods 700 optionally include determining the line length based on whether constituent parts are produced in series or parallel. In particular, the line length is shorter when constituent parts are produced in parallel on separate lines. As an example, the fractional pulse assembly lines of the first manufacturing zone and the second manufacturing zone are in parallel with one another and thus have a shorter collective line length than they would have if they were in series with one another.

In some examples, methods 700 at 706 optionally include determining whether to produce different constituent parts on the same assembly line (in series), or on different assembly lines (in parallel) at 707. In some examples, this determination is based on at least an amount of similarity between the constituent parts (e.g., similarity in size, shape, geometry, and/or other physical characteristics) and/or an amount of similarity in the work processes to be performed on the constituent parts (e.g., holes to be drilled, painting, curing, fastening, assembling of constituent parts, etc.).

As an example, a left side wing (e.g., left wing 322) and a right side wing (e.g., right wing 324) are produced on the same assembly line, in some examples, for at least the reasons that the same and/or similar work processes are performed on both wings and/or because the physical properties of the wings (e.g., size, shape, etc.) are similar enough to one another to be manufactured on the same assembly line. In some such examples, both wings are produced on the first assembly line of the first manufacturing zone. As another example, a forward main cabin portion of a fuselage of the aircraft assembly (e.g., forward main cabin portion 308 of fuselage 302) and an aft main cabin portion of the fuselage (e.g., aft main cabin portion 314) are produced on the same assembly line, in some examples, for at least the reasons that the same and/or similar work processes are performed on both the fuselage section and/or because the physical properties of the fuselage sections (e.g., size, shape, color, etc.) are similar enough to one another to be manufactured on the same assembly line. In particular, the fuselage sections have the same and/or similar semi-cylindrical shape, in some examples. In some such examples, both fuselage sections are produced on the second assembly line of the second manufacturing zone. As yet another example, a tail portion (e.g., tail portion 316) of the fuselage includes two frustoconical sections, in some examples. In some such examples, because of their similarity in shape, these two fuselage sections additionally or alternatively are manufactured in series on the same assembly line. Additionally or alternatively, the determining at 707 is based on takt time. In particular, in some examples, processing the constituent parts in series on the same line may take more time than processing the constituent parts in parallel on different lines. In some such examples, the constituent parts may need to be processed in parallel on separate lines in order to meet takt time.

The determining at 707 additionally or alternatively is based on the spacing of a work process along the length of the constituent parts. As introduced above, a given work process may be performed repeatedly on different parts of a constituent part at a given workstation by fractionally pulsing the constituent part in sections past the workstation. In particular, the work process may be performed at regular intervals along the length of the constituent part (e.g., windows may be installed every X meters along the fuselage skin) as the different sections of the constituent part are fractionally pulsed past the workstation. In some such examples, the regular intervals are equal to the pulse length. In such examples, the work process may be performed in series with the other work stations on an assembly line when the regular interval of the work process is equal to, an integer multiple of, and/or a 1/X fraction of the pulse length of the assembly line (and the regular intervals of the other work processes on the assembly line).

In this way, different work processes may be similarly divisible along the length of the constituent part on the same assembly line, such that the regular intervals at which the work processes are performed along the length of the constituent part are equal to one another, are integer multiples of one another, and/or are 1/X fractions of one another. If a work process cannot be divided into regular intervals that are equal to, integer multiples of, and/or 1/X fractions of the regular intervals of the other work processes, and/or the pulse length, of the assembly line, then the work process may need to be performed on a different assembly line and/or a different section of the assembly line that has a different pulse length and/or frequency.

Thus, the determining whether work processes may be performed in series together (on the same portion of the same assembly line) at 707 may be based on the similarity in the divisibility of the work processes along the length of the constituent parts to be worked on. Specifically determining whether work processes may be performed in series together on the same portion of the same assembly line (i.e., whether workstations may be adjacently positioned next to one another on the assembly line) may be based on whether the work process may be performed at regular intervals along the length of the constituent parts that are equal to, integer multiples of, and/or 1/X fractions of one another.

The determining at 704 additionally or alternatively is based on physical characteristics of the sub-components being pulsed down the fractional pulse assembly line. As examples, methods 700 optionally includes determining the line length based on one or more of a sub-component part length at 708, a number of sub-components in a component at 709, a size of gaps between adjacent sub-components in series on the line at 710, and/or a number of gaps between sub-components in series on the line at 712. In particular, the line length is longer when the sub-components are longer, there are more sub-components in series on the line, there are more gaps between sub-components in series on the line, and/or the size of those gaps is larger.

Additionally or alternatively, the line length is determined at 704 based on the workstations. As examples, methods 700 optionally include determining the line length based on one or more of the size of the workstations at 714, the number of workstations at 716, and/or the number and/or size of the gaps between workstations at 718. The line length is longer when there are more workstations, when the workstations are larger (e.g., wider), and/or when there are more and/or larger gaps between the workstations because more and/or larger workstations and/or gaps increase the distance the constituent parts must travel to pass through all of the workstations on the fractional pulse assembly line.

In some examples, the size of the workstations, the number of workstations, and/or the number and/or size of the gaps between workstations is/are determined based on a divisibility of the constituent parts and/or on workspace constraints. As an example, when the constituent parts are divisible into more sections, the number of workstations that may be squeezed along a length of the constituent part to perform work on the constituent part at the same time, increases. However, the number of workstations that may perform work on the constituent part at the same time is limited by the physical size of the work-performing devices. That is, the work-performing devices may limit the amount that the workstations may be shrunk to accommodate more workstations, and in some examples, the workstations may be no smaller than the size of the work-performing devices.

The divisibility of the constituent parts into smaller sections is determined based on one or more of an amount of similarity in the physical characteristics of the constituent parts along a length of the constituent parts, where the work processes are to be performed on the constituent parts along the length of the constituent parts (i.e., the locations on the constituent parts at which the work processes are to be performed), and/or a repeatability of the work process along a length of the constituent parts (i.e., an amount of similarity in a given work process to be performed on the constituent parts along a length of the constituent parts). For example, constituent parts may be broken down into increasingly shorter sections, until a given process (e.g., drilling) becomes too dissimilar at the different sections of the constituent part such that it is impractical for the process to be performed at all the sections in series (e.g., the work process is no longer repeatable at each of the sections). Thus, the determining at 704 optionally includes determining a minimum common section length at which a constituent part may be broken down into while still maintaining enough similarity between the sections of the constituent part to have the same work process performed on all of the sections of the constituent part in series.

As discussed previously, reducing workstation size may increase worker safety for at least the reason that it may reduce the size of the work-performing devices handled by workers and/or reduce the amount the workers need to move to perform the work processes. Further, increasing the number of workstations that simultaneously perform work on the constituent part may increase parallel processing of the part and/or increase production efficiencies since less movement may be required to perform the work processes.

At 720, methods 700 include determining an average line velocity. The determining the average line velocity is based on the takt time. In particular, the average line velocity is the average line velocity needed to meet takt time, in some examples. In some such examples, the determining the average line velocity takes into account scheduled worker breaks, maintenance of work-performing devices at the workstation, gaps in the assembly line (e.g., such as at an assembly area (e.g., assembly area 430) where various sub-components are assembled into a component), and/or parallel vs. series processing of parts. In particular, series processing of parts at these gaps/breaks in the assembly line may create bottlenecks that necessitate in increase in the average line velocity of the assembly line.

By taking worker breaks, maintenance, and/or other scheduled gaps in the line where work processes are not performed into account, the line may continue to move, despite no work being performed on one or more of the constituent parts on the line. By keeping the line fractionally pulsing substantially continuously and/or pulsing the constituent parts on the line more regularly, uncompleted work processes may be more readily identified because a holdup in a continuously pulsing line is more visible (i.e., components downstream of the holdup may continue to move, whereas components upstream of the holdup may stop, thus providing a visible indication of where the holdup occurred). In this way, workstation non-performance may be more easily and readily identified and corrected than conventional manufacturing approaches where constituent parts are not pulsed regularly, or are pulsed regularly but at much longer time intervals. In some examples, small time buffers may be created between work processes to accommodate for slight delays in work processes. However, for lengthier delays, line movement may stop upstream of the holdup, allowing a supervisor to readily identify and remedy the holdup.

At 722, methods 700 include determining a pulse length based on one or more of a minimum workstation length and/or a minimum section length of constituent parts. As discussed above at 704, the minimum workstation length may be limited by the physical size of the work-performing devices, and/or spacing required between work-performing devices. The minimum section length of the constituent parts may be determined based on the divisibility of the work process along the length of the constituent part (i.e., how many regular intervals along the length of the constituent part a given work process may be performed in the same or substantially the same manner). The divisibility of the work process in turn may be determined based on a uniformity of the constituent parts along a length of the constituent parts (the different sections of the constituent parts), and/or a uniformity of the work processes to be performed along the length of the constituent parts. As introduced above, the constituent parts may be broken down into equal length sections and the same and/or similar work process may be performed repeatedly on each of the sections of the constituent part by pulsing the constituent part past the workstation at a constant pulse length and/or frequency. Thus, this pulse length may be equal to, an integer multiple of, and/or a 1/X fraction of the length of each of the sections of the constituent part. In this way, the work process may be performed repeatedly in the same and/or similar manner at regular intervals along the length of the constituent part.

Additionally or alternatively, the pulse length is equal to the minimum workstation length, and/or an integer multiple thereof. Thus, in such examples, the constituent parts are pulsed by no less than the length of the smallest workstation and/or by no less than the shortest section of the constituent parts.

In some examples, the pulse length is determined based on the divisibility of the work process along the length of the constituent parts.

At 724, methods 700 include determining a pulse frequency based on one or more of the average line velocity, the line length, and/or the pulse length. In particular, the pulse frequency may be the frequency needed to achieve the average line velocity given the line length and the pulse length. In particular, the line length may be divided by average line velocity to provide a total line time. The line length may be divided by the pulse length to determine the number of pulses on the line. The number of pulses divided by the total line time provides the pulse frequency (i.e., number of pulses per unit of time). The pulse period (e.g., pulse period 462) is then the time period between each pulse and may include both the work period during which work is performed on the constituent part and the time it takes to pulse the constituent part (e.g., pulse duration 466).

At 726, methods 700 optionally include constructing the assembly line based on one or more of the above specifications (e.g., line length, pulse length, pulse frequency, etc.).

Illustrative, non-exclusive examples of inventive subject matter according to the present disclosure are described in the following enumerated paragraphs:

A. An aircraft manufacturing system for repetitively manufacturing aircraft assemblies, wherein each aircraft assembly comprises at least a first aircraft subassembly and a second aircraft subassembly, the aircraft manufacturing system comprising:

a first manufacturing zone configured to repetitively manufacture first aircraft subassemblies;

a second manufacturing zone configured to repetitively manufacture second aircraft subassemblies; and a third manufacturing zone configured to receive the first aircraft subassemblies from the first manufacturing zone, to receive the second aircraft subassemblies from the second manufacturing zone, and to repetitively assemble the first aircraft subassemblies and the second aircraft subassemblies into the aircraft assemblies.

A1. The aircraft manufacturing system of paragraph A, wherein:

the aircraft assemblies are aircraft;

the first aircraft subassemblies are wings; and the second aircraft assemblies are fuselage sections.

A1.1 The aircraft manufacturing system of paragraph A1, wherein the fuselage sections comprise main cabin portions of the fuselage.

A2. The aircraft manufacturing system of any of paragraphs A-A1.1, wherein the first manufacturing zone and the second manufacturing zone are substantially parallel to one another such that an overall flow direction of the first aircraft subassemblies within the first manufacturing zone is substantially parallel to an overall flow direction of the second aircraft subassemblies within the second manufacturing zone.

A3. The aircraft manufacturing system of any of paragraphs A-A2, wherein the first manufacturing zone comprises a first assembly line and wherein the second manufacturing zone comprises a second assembly line.

A3.1. The aircraft manufacturing system of paragraph A3, wherein the first assembly line and the second assembly line each include a conveyor system, and wherein a conveyor system of the first assembly line is configured to advance the first aircraft subassemblies along the first assembly line within the first manufacturing zone, and wherein a conveyor system of the second assembly line is configured to advance the second aircraft subassemblies along the second assembly line within the second manufacturing zone.

A3.2. The aircraft manufacturing system of any of paragraphs A3-A3.1, wherein the first assembly line and the second assembly line comprise workstations where work is performed on constituent parts of the aircraft assembly, and wherein work processes performed at adjacent workstations are different.

A3.2.1. The aircraft manufacturing system of paragraph A3.2, wherein adjacent workstations comprise different robots, different machines and/or different manufacturing personnel.

A3.2.2. The aircraft manufacturing system of any of paragraphs A3.2-A3.2.1, wherein the workstations are shorter than the first aircraft subassemblies and the second aircraft subassemblies, such that two or more of the workstations perform work on the same subassembly simultaneously.

A3.2.3. The aircraft manufacturing system of paragraph A3.2.2, wherein the lengths of the workstations are non-uniform.

A3.2.4. The aircraft manufacturing system of any of paragraphs A3.2-A3.2.3, wherein each of the workstations of the first assembly line perform a unique type of work process and/or wherein each of the workstations of the second assembly line perform a unique type of work process.

A3.2.5. The aircraft manufacturing system of any of paragraphs A3.2-A3.2.3, wherein each of the workstations of the first assembly line perform exactly one work process and/or wherein each of the workstations of the second assembly line perform exactly one work process.

A3.3. The aircraft manufacturing system of any of paragraphs A3.1-A3.2.3, wherein the conveyor system of the first manufacturing zone is configured to fractionally pulse the first aircraft subassemblies forward along the first assembly line, and wherein the conveyor system of the second manufacturing zone is configured to fractionally pulse the second aircraft subassemblies forward along the second assembly line.

A3.3.1. The aircraft manufacturing system of paragraph A3.3 when depending from any of paragraphs A3.2-A3.2.3, wherein the conveyor system of the first manufacturing zone is configured to advance the first aircraft subassemblies by at most a minimum length of the workstations during each pulse, and wherein the conveyor system of the second manufacturing zone is configured to advance the second aircraft subassemblies by at most a minimum length of the workstations during each pulse.

A3.4. The aircraft manufacturing system of any of paragraphs A3-A3.3.1, wherein the first aircraft subassemblies include both a left side wing and a right side wing.

A3.4.1. The aircraft manufacturing system of paragraph A3.4, wherein the first assembly line is configured to deliver the left side wing in a final left side wing orientation to the third manufacturing zone and deliver the right side wing in a final right side wing orientation to the third manufacturing zone.

A3.4.1.1. The aircraft manufacturing system of paragraph A3.4, wherein the left side wing is configured to be coupled to a fuselage in the final left side wing orientation, and wherein the right side wing is configured to be coupled to the fuselage in the final right side wing orientation.

A4. The aircraft manufacturing system of any of paragraphs A3.1-A3.2.1, wherein the first manufacturing zone and the second manufacturing zone comprise doorways that are configured to permit the constituent parts to be delivered to the workstations.

A4.1. The aircraft manufacturing system of paragraph A4, wherein the first manufacturing zone and the second manufacturing zone include feeder lines that are configured to one or more orient the constituent parts in a desired orientation and advance the constituent parts away from the doorways and/or towards the first assembly line or second assembly line.

A5. The aircraft manufacturing system of any of paragraph A-A4, wherein the first manufacturing zone and the second manufacturing zone are separated from one another by at most three kilometers (km).

A5.1. The aircraft manufacturing system of paragraph A5, wherein the first manufacturing zone and the second manufacturing zone are separated from one another by at least 10 meters (m).

A6. The aircraft manufacturing system of any of paragraphs A-A5, wherein the third manufacturing zone is physically connected to the first manufacturing zone and the second manufacturing zone.

A7. The aircraft manufacturing system of any of paragraphs A-A6, wherein the third manufacturing zone is physically detached from at least one of the first manufacturing zone and the second manufacturing zone.

A7.1. The aircraft manufacturing system of paragraph A7, wherein the third manufacturing zone is physically detached from the second manufacturing zone.

A7.1.1. The aircraft manufacturing system of paragraph A7.1, wherein the third manufacturing zone is separated from the second manufacturing zone by at least 5 m and at most three km.

A7.2. The aircraft manufacturing system of paragraph A7, wherein the third manufacturing zone is physically detached from the first manufacturing zone.

A7.2.1. The aircraft manufacturing system of paragraph A7.2, wherein the third manufacturing zone is separated from the first manufacturing zone by at least 5 m and at most three km.

A7.3. The aircraft manufacturing system of any of paragraphs A7-A7.2.1, further comprising delivery pathways extending along at least a portion of a perimeter of one of more of the first manufacturing zone, the second manufacturing zone, and the third manufacturing zone, wherein the delivery pathways are configured to permit motorized vehicles to travel around at least a portion of one or more of the first manufacturing zone, the second manufacturing zone, and the third manufacturing zone.

A7.3.1. The aircraft manufacturing system of paragraph A7.3 when depending from any of paragraphs A4-A4.1, wherein the delivery pathways are configured to permit the motorized vehicles to deliver the constituent parts to the doorways of the first manufacturing zone and/or the second manufacturing zone.

A8. The aircraft manufacturing system of any of paragraphs A-A7.2, further comprising a hoist mechanism configured to lift the first aircraft subassemblies from the first manufacturing zone to the third manufacturing zone.

A8.1. The aircraft manufacturing system of paragraph A8, wherein the hoist mechanism comprises a crane.

A8.2. The aircraft manufacturing system of paragraph A8.2 when depending from any of paragraphs A7.3-A7.3.1, wherein one or more of the delivery pathways extend underneath the hoist mechanism.

A8.3. The aircraft manufacturing system of any of paragraphs A8-A8.2 when depending from A3.4.1-A3.4.1.1, wherein the hoist mechanism is configured to receive the left side wing from the first manufacturing zone in the final left side orientation and deliver the left side wing to the third manufacturing zone in the final left side orientation, and is configured to receive the right side wing from the first manufacturing zone in the final right side orientation and deliver the right side wing to the third manufacturing zone in the final right side orientation.

A9. The aircraft manufacturing system of any of paragraphs A-A8.3, further comprising a fourth manufacturing zone configured to repetitively manufacture third aircraft subassemblies.

A9.1. The aircraft manufacturing system of paragraph A9, wherein the third aircraft subassemblies comprise one or more of a cockpit portion of the fuselage, a tail portion of the fuselage, and an intermediate section of the fuselage, wherein the intermediate section of the fuselage includes one or more of a wing box and an over-wing portion of the fuselage.

A9.2. The aircraft manufacturing system of any of paragraph A9-A9.1, wherein the third manufacturing zone is further configured to receive the third aircraft subassemblies from the fourth manufacturing zone, and to repetitively assemble the third aircraft subassemblies with the first aircraft subassemblies and the second aircraft subassemblies into the aircraft assemblies.

A9.3. The aircraft manufacturing system of any of paragraphs A9-A9.2, wherein the fourth manufacturing zone is positioned between the first manufacturing zone and the second manufacturing zone.

A9.4. The aircraft manufacturing system of any of paragraphs A9-A9.3, wherein the fourth manufacturing zone comprises hangar bays configured to house each of the third aircraft subassemblies during assembly and manufacture of the third aircraft subassemblies.

A9.5. The aircraft manufacturing system of any of paragraphs A9-A9.4, wherein the fourth manufacturing zone comprises doorways that are configured to permit constituent parts to be delivered to the hangar bays.

A9.6. The aircraft manufacturing system of paragraph A9.5, wherein the fourth manufacturing zone includes feeder lines that orient the constituent parts in a desired orientation.

A9.7. The aircraft manufacturing system of any of paragraphs A9-A9.6, wherein the fourth manufacturing zone is substantially parallel with the first manufacturing zone and the second manufacturing zone such that an overall flow direction of the third aircraft subassemblies is substantially parallel to an overall flow direction of the first aircraft subassemblies and an overall flow direction of the second aircraft subassemblies.

A9.8. The aircraft manufacturing system of any of paragraphs A9-A9.7, wherein the fourth manufacturing zone is physically connected to the third manufacturing zone.

A9.9. The aircraft manufacturing system of any of paragraphs A9-A9.7, wherein the fourth manufacturing zone is physically detached from the third manufacturing zone.

A9.9.1. The aircraft manufacturing system of paragraph A9.9, wherein the third manufacturing zone is separated from the fourth manufacturing zone by at least 5 m.

A9.10. The aircraft manufacturing system of any of paragraphs A9-A9.9.1 when depending from any of paragraphs A7.3-A7.3.1, wherein the delivery pathways extend around at least a portion of a perimeter of the fourth manufacturing zone, and wherein the delivery pathways are configured to permit motorized vehicles to travel around at least a portion of the perimeter of the fourth manufacturing zone.

A9.10.1. The aircraft manufacturing system of paragraph A9.10, wherein the delivery pathways are configured to permit the motorized vehicles to deliver constituent parts to the doorways of the fourth manufacturing zone.

A9.11. The aircraft manufacturing system of any of paragraphs A9-A9.10.1, further comprising one or more transportation devices that are configured to transport constituent parts to, from, and/or between one or more of the manufacturing zones.

A9.11.1. The aircraft manufacturing system of paragraph A9.11 when depending from any of paragraphs A8-A8.2, wherein the one or more transportation devices include the hoist mechanism.

A9.11.2. The aircraft manufacturing system of any of paragraphs A9.11-A9.11.1, wherein the one or more transportation devices comprise one or more of a hoist mechanism, a conveyor system, and shuttle.

A9.11.3. The aircraft manufacturing system of paragraph A9.11.2, wherein the shuttle comprises a motorized vehicle.

A9.11.4. The aircraft manufacturing system of any of paragraphs A9.11-A9.11.2, wherein the one or more transportation devices comprise a first transportation device that is configured to transfer the first aircraft subassemblies between the first manufacturing zone and the third manufacturing zone, and a second transportation device that is configured to transfer the second aircraft subassemblies between the second manufacturing zone and the third manufacturing zone.

A9.11.5. The aircraft manufacturing system of paragraph A9.11.4 when depending from any of paragraphs A8-A8.2, wherein the first transportation device comprises the hoist mechanism.

A9.11.6 The aircraft manufacturing system of any of paragraphs A9.11-A9.11.5 when depending from any of paragraphs A9-A9.10, wherein the one or more transportation devices comprise a third transportation device that is configured to transfer one or more of the third aircraft subassemblies between the fourth manufacturing zone and the third manufacturing zone.

A9.11.7. The aircraft manufacturing system of any of paragraphs A9.11-A9.11.6 when depending from any of paragraphs A9-A9.10, wherein the one or more transportation devices comprise a fourth transportation device that is configured to transfer one or more of the third aircraft subassemblies between the fourth manufacturing zone and the second manufacturing zone.

B. A method for repetitively manufacturing aircraft assemblies, the method comprising:
assembling first aircraft subassemblies and second aircraft subassemblies in parallel on separate assembly lines at a common geographic region; and transferring the first aircraft subassemblies and the second aircraft subassemblies to a final assembly facility located in the same common geographic region.

B1. The method of paragraph B, wherein the first aircraft subassemblies are aircraft wings, and wherein the second aircraft subassemblies are portions of an aircraft fuselage.

B2. The method of paragraph B1, wherein the assembling the first aircraft subassemblies and the second aircraft subassemblies in parallel comprises assembling the first aircraft subassemblies and the second aircraft subassemblies in parallel temporally and/or spatially.

B3. The method of any of paragraphs B1-B2, wherein the assembling the first aircraft subassemblies and the second aircraft subassemblies in parallel on separate assembly lines comprises sending the first aircraft subassemblies and/or constituent parts thereof down a first assembly line and sending the second aircraft subassemblies and/or constituent parts thereof down a second assembly line.

B3.1. The method of paragraph B3, wherein the assembling the first aircraft subassemblies and the second aircraft subassemblies in parallel on separate assembly lines at a common geographic region comprises one or more of sending different components of the first aircraft subassemblies in series down the first assembly line and sending different components of the second aircraft subassemblies in series down the second assembly line.

B3.1.1. The method of paragraph B3.1, wherein the sending the different components of the first aircraft subassemblies in series down the first assembly line comprises sending both a right side wing and a left side wing and/or constituent parts thereof down the first assembly line in series.

B3.2 The method of any of paragraphs B3-B3.1.1, wherein the sending the first aircraft subassemblies and/or constituent parts thereof down the first assembly line comprises fractionally pulsing the first aircraft subassemblies and/or the constituent parts thereof down the first assembly line, and wherein the sending the second aircraft subassemblies and/or the constituent parts thereof down the second assembly line comprises fractionally pulsing the second aircraft subassemblies and/or the constituent parts thereof down the second assembly line.

B3.3. The method of any of paragraphs B3-B3.2, wherein the sending the first aircraft subassemblies and/or the constituent parts thereof down the first assembly line and sending the second aircraft subassemblies and/or the constituent parts thereof down the second assembly line comprises advancing the first aircraft subassemblies and/or the constituent parts thereof and the second aircraft subassemblies and/or the constituent parts thereof in parallel overall flow directions.

B3.4. The method of any of paragraphs B3-B3.3, wherein the sending the first aircraft subassemblies and/or the constituent parts thereof down the first assembly line and sending the second aircraft subassemblies and/or the constituent parts thereof down the second assembly line comprises sending the first aircraft subassemblies and/or the constituent parts thereof and the second aircraft subassemblies and/or the constituent parts thereof down the first assembly line and the second assembly line, respectively, at a common average velocity.

B3.4.1. The method of paragraph B3.4 when depending from paragraph B3.2, wherein the sending the first aircraft subassemblies and/or the constituent parts thereof and the second aircraft subassemblies and/or the constituent parts thereof down the first assembly line and the second assembly line, respectively, at the common average velocity comprises fractionally pulsing the first aircraft subassemblies and/or the constituent parts thereof and the second aircraft subassemblies and/or the constituent parts thereof at the common average velocity.

B4. The method of any of paragraphs B-B3.3, wherein the transferring the first aircraft subassemblies to the final assembly facility comprises hoisting the first aircraft subassemblies to the final assembly facility.

B5. The method of any of paragraphs B-B3, wherein the transferring the first aircraft subassemblies to the final assembly facility comprises transferring the first aircraft subassemblies by at most 1 km.

B6. The method of any of paragraphs B-B5, further comprising feeding constituent parts along one or more feeder lines to various positions along the first assembly line and/or the second assembly line, respectively.

B6.1. The method of paragraph B6, wherein the feeding the constituent parts comprises orienting the constituent parts, and advancing them towards one or more of the first assembly line and the second assembly line.

B6.2. The method of any of paragraphs B6-B6.1, wherein the assembling the first aircraft subassemblies and the second aircraft subassemblies comprises adding the constituent parts to one or more precursor structures of one or more of the first aircraft subassemblies and the second aircraft subassemblies.

C. A method for repetitively manufacturing aircraft, the method comprising: periodically advancing an aircraft component down an assembly line by less than a length of the aircraft component.

C1. The method of paragraph C, wherein the periodically advancing comprises:

advancing the aircraft component by a pulse length that is less than the length of the aircraft component; then stopping movement of the aircraft component for a duration; and then advancing the aircraft component by the pulse length.

C2. The method of any of paragraphs C-C1, further comprising performing work on the aircraft component at workstations during the duration when the aircraft component is not moving.

C2.1. The method of paragraph C2, wherein the performing work on the aircraft component comprises adding a constituent part to the aircraft component, removing material from the aircraft component, and/or modifying the aircraft component.

C2.2. The method of any of paragraphs C2-C2.1, wherein the performing work on the aircraft component at the workstations comprises performing different types of work processes at two or more of the workstations.

C2.2.1. The method of paragraph C2.2, wherein the performing different types of work processes at the two or more of the workstations comprises performing different types of work processes at each of the workstations.

C2.3. The method of any of paragraphs C2.2-C2.2.1, wherein the performing different types of work processes at the two or more of the workstations comprises simultaneously performing the different types of work processes at the two or more of the workstations.

C2.4. The method of any of paragraphs C-C2.3, wherein the performing work on the aircraft component at the workstations comprises performing exactly one type of work process at each of the workstations.

C3. The method of any of paragraphs C-C2.4, further comprising feeding constituent parts to the assembly line via one or more feeder lines.

C4. The method of any of paragraphs C-C3, wherein the periodically advancing comprises periodically advancing the aircraft component by the same amount during each periodic advancement.

C5. The method of any of paragraphs C-C4, further comprising advancing the aircraft component at a common average velocity along the assembly line, and varying one or more of a pulse frequency and a pulse length of the periodic advancing at different sections of the assembly line.

C5.1. The method of paragraph C5, wherein the varying the pulse frequency and pulse length at different sections of the assembly line comprises:

at a first section of the assembly line, pulsing at a first frequency and advancing the aircraft component a first distance during each pulse; and at a second section of the assembly line, pulsing at a second frequency that is higher than the first frequency, and advancing the aircraft component a second distance that is less than the first distance during each pulse.

C5.2. The method of any of paragraphs C5-C5.1, wherein the pulse frequency and pulse length are varied based on an amount of divisibility in a work process to be performed on the aircraft component and/or a size of one or more workstations on the assembly line.

C5.2.1. The method of paragraph C5.2, wherein the pulse frequency increases and the pulse length decreases for increases in the divisibility of the work process to be performed on the aircraft component and/or decreases in the size of the one or more workstations.

D. A method for designing an aircraft manufacturing system, the method comprising: determining a fractional pulse length to fractionally pulse one or more constituent parts of an aircraft on a fractional pulse assembly line based on one or more of a minimum workstation length of one or more assembly line workstations and/or a minimum section length of one or more work processes along a length of the one or more constituent parts.

D1. The method of paragraph D, wherein the minimum workstation length of the one or more assembly line workstations is determined based a physical size of one or more work-performing devices included at the one or more assembly line workstations.

D1.2. The method of paragraph D1, wherein the fractional pulse length is equal to, an integer multiple of, and/or a 1/X fraction of the minimum workstation length of the one or more workstations, where X is an integer.

D2. The method of any of paragraphs D-D1.2, wherein the minimum section length of the one or more work processes is determined based on a divisibility of the one or more work processes along the length of the one or more constituent parts.

D2.1. The method of paragraph D2, wherein the divisibility of the one or more work processes along the length of the one or more constituent parts is determined based on one or more of where the one or more work processes are to be performed on the one or more constituent parts, an amount of similarity in a given work process to be performed on the constituent parts along a length of the constituent parts, and an amount of similarity in one or more physical characteristics of the constituent parts along the length of the constituent parts.

D2.2. The method of any of paragraphs D2-D2.1, wherein the fractional pulse length is one or more of equal to, an integer multiple of, and/or a 1/X fraction of the minimum section length, where X is an integer.

D3. The method of any of paragraphs D-D2.2, further comprising determining a number of assembly lines to include in the aircraft manufacturing system based on one or more of a number of aircraft subassemblies to manufacture, an amount of similarity in the work processes to be performed on the aircraft subassemblies and/or constituent parts thereof, and an amount of similarity in the physical characteristics of the aircraft subassemblies and/or constituent thereof.

D3.1 The method of paragraph D3, wherein the aircraft subassemblies include left and right side wings and/or sections of a fuselage.

D3.2. The method of any of paragraphs D3-D3.1, wherein the determining how many assembly lines to include in the aircraft manufacturing system includes determining whether different types of aircraft subassemblies and/or constituent parts thereof are to be produced together on the same assembly line or separately on different assembly lines.

D3.2.1. The method of paragraph D3.2, wherein the number of assembly lines decreases when more of the aircraft subassemblies and/or constituent parts are produced on the same assembly line.

D3.3. The method of any of paragraphs D3-D3.2.1, wherein the determining how many assembly lines to include in the aircraft manufacturing system includes determining whether different types of aircraft subassemblies and/or constituent parts thereof are to be produced in parallel and/or in series with one another.

D3.3.1. The method of paragraph D3.3, wherein the number of assembly lines increases when more of the aircraft subassemblies and/or constituent parts are produced in parallel.

D4. The method of any of paragraphs D-D3, further comprising determining a pulse frequency based on one or more of an average velocity of the fractional pulse assembly line and the fractional pulse length.

D4.1. The method of paragraph D4, wherein the average velocity of the fractional pulse assembly line is determined based on one or more of a distance travelled by the constituent parts on the fractional pulse assembly line, a production rate of the constituent parts, and a number of assembly lines configured to produce the constituent parts in parallel.

D4.1.1. The method of paragraph D4.1, wherein the production rate of the constituent parts is determined based on a takt time of the aircraft and a number of the constituent parts included in the aircraft.

D4.1.2. The method of any of paragraphs D4.1-D4.1.1, wherein the average velocity of the fractional pulse assembly line decreases when the number of assembly lines configured to produce the constituent parts in parallel increases.

D4.1.3. The method of any of paragraphs D4.1-D4.1.2, wherein the distance travelled by the constituent parts on the fractional pulse assembly line is determined based on a length of the constituent parts, a length of one or more gaps separating the constituent parts on the fractional pulse assembly line, and/or a length of the fractional pulse assembly line.

D4.2. The method of any of paragraph D4-D4.1.3, wherein the fractional pulse frequency is equal to the average velocity of the fractional pulse assembly line divided by the fractional pulse length.

D5. Building the aircraft manufacturing system designed according to the method of any of paragraphs D-D4.2.

E1. A method for operating a fractional pulse assembly line and/or for repetitively manufacturing aircraft, the method comprising:

fractionally pulsing a constituent part down an assembly line, wherein the fractional pulsing comprises periodically advancing the constituent part down the assembly line by less than a length of the constituent part.

E2. The method of paragraph E1, wherein the fractional pulsing comprises simultaneously performing different types of work on the constituent part at different workstations on the assembly line.

E3. The method of any of paragraphs E1-E2, further comprising fractionally pulsing two or more different types of constituent parts in series with one another down the assembly line.

E4. The method of any of paragraphs E1-E3, further comprising fractionally pulsing two or more constituent parts in parallel with one another down two or more different assembly lines.

E5. The method of paragraph E4, wherein the two or more different assembly lines are located in different manufacturing zones.

E6. The method of any of paragraphs E4-E5, further comprising one or more of merging the two or more different assembly lines to form a common assembly line, assembling the two or more constituent parts to form a constituent part assembly, and/or fractionally pulsing the constituent part assembly down the common assembly line.

E7. The method of any of paragraphs E4-E6, further comprising merging the two or more different assembly lines to form a common assembly line, wherein the fractionally pulsing two or more constituent parts in parallel with one another down two or more different assembly lines comprises pulsing the constituent parts in parallel at the same average line velocity such that the constituent parts are provided to the common assembly line at approximately the same time (i.e., just in time).

E8. The method of any of paragraphs E1-E6, further comprising the subject matter of any of paragraphs B1-D5.

While the disclosure herein refers to aircraft assemblies and aircraft, the inventive subject matter herein may be applied to any manufactured assembly constructed from multiple constituent parts. Accordingly, the term "aircraft" herein may be replaced with one or more of the broad terms "apparatus," "large apparatus," "assembly," "large assemblies," "object," "large object," "manufactured assembly," or "large manufactured assembly" without departing from the scope of the present disclosure. Illustrative, non-exclusive examples of other manufactured assemblies to which the disclosed inventive subject matter may apply include (but are not limited to) marine craft, ships, submarines, land vehicles, space vehicles, rail vehicles, machinery, wind turbines, and buildings.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method for repetitively manufacturing aircraft assemblies, the method comprising: assembling first aircraft subassemblies and second aircraft subassemblies in parallel on separate assembly lines at a common geographic region; and transferring the first aircraft subassemblies and the second aircraft subassemblies to a final assembly facility located in the same common geographic region; wherein the first aircraft subassemblies are aircraft wings, wherein the second aircraft subassemblies are portions of an aircraft fuselage, wherein the transferring the first aircraft subassemblies and the second aircraft subassemblies to the final assembly facility comprises transferring the first aircraft subassemblies and the second aircraft subassemblies by at most 1 kilometer (km), wherein the assembling the first aircraft subassemblies comprises producing a left side wing in a final left-side wing orientation and producing a right side wing in a final right-side wing orientation, and wherein the transferring the first aircraft subassemblies to the final assembly facility comprises delivering the left side wing in the final left-side wing orientation to the final assembly facility and delivering the right side wing in the final right-side wing orientation to the final assembly facility.

2. The method of claim 1, wherein the transferring the first aircraft subassemblies to the final assembly facility comprises hoisting the first aircraft subassemblies to the final assembly facility.

3. The method of claim 1, wherein the assembling the first aircraft subassemblies and the second aircraft subassemblies in parallel on separate assembly lines comprises sending one or more of the first aircraft subassemblies and constituent parts thereof down a first assembly line and sending one or more of the second aircraft subassemblies and constituent parts thereof down a second assembly line, and wherein the sending the one or more of the first aircraft subassemblies and the constituent parts thereof down the first assembly line and the sending the one or more of the second aircraft subassemblies and the constituent parts thereof down the second assembly line comprises advancing the one or more of the first aircraft subassemblies and the constituent parts thereof and the one or more of the second aircraft subassemblies and the constituent parts thereof in parallel overall directions.

4. The method of claim 1, wherein the assembling the first aircraft subassemblies and the second aircraft subassemblies in parallel comprises assembling the first aircraft subassemblies and the second aircraft subassemblies in one or more of parallel temporally and parallel spatially.

5. The method of claim 1, wherein the transferring comprises transferring the first aircraft subassemblies and the second aircraft subassemblies to the final assembly facility at approximately the same time.

6. The method of claim 1, further comprising combining the first aircraft subassemblies and the second aircraft subassemblies in the final assembly facility.

7. The method of claim 1, wherein the portions of the aircraft fuselage comprise main cabin portions of the aircraft fuselage.

8. The method of claim 1, wherein the assembling the first aircraft subassemblies and the second aircraft subassemblies in parallel comprises assembling the first aircraft subassemblies in a first manufacturing zone and assembling the second aircraft subassemblies in a second manufacturing zone.

9. The method of claim 8, wherein the first manufacturing zone and the second manufacturing zone are substantially parallel to one another such that an overall flow direction of the first aircraft subassemblies within the first manufacturing zone is substantially parallel to an overall flow direction of the second aircraft subassemblies within the second manufacturing zone.

10. The method of claim 9, wherein the first manufacturing zone and the second manufacturing zone are separated from one another by at most 3 km.

11. The method of claim 10, wherein the first manufacturing zone and the second manufacturing zone are separated from one another by at least 10 meters (m).

12. The method of claim 10, wherein the first manufacturing zone and the second manufacturing zone are in different buildings.

13. The method of claim 1, wherein the assembling the first aircraft subassemblies and the second aircraft subassemblies in parallel on separate assembly lines comprises sending one or more of the first aircraft subassemblies and constituent parts thereof down a first assembly line and sending one or more of the second aircraft subassemblies and constituent parts thereof down a second assembly line.

14. The method of claim 13, wherein the sending the one or more of the first aircraft subassemblies and constituent parts thereof down the first assembly line comprises fractionally pulsing one or more of the first aircraft subassemblies and the constituent parts thereof down the first assembly line, and wherein the sending the one or more of the second aircraft subassemblies and the constituent parts thereof down the second assembly line comprises fractionally pulsing one or more of the second aircraft subassemblies and the constituent parts thereof down the second assembly line.

15. The method of claim 13, wherein the sending the one or more of the first aircraft subassemblies and the constituent parts thereof down the first assembly line and the sending the one or more of the second aircraft subassemblies and the constituent parts thereof down the second assembly line comprises sending the one or more of the first aircraft subassemblies and the constituent parts thereof, and the one or more of the second aircraft subassemblies and the constituent parts thereof down the first assembly line and the second assembly line, respectively, at a common average velocity.

16. The method of claim 13, wherein the assembling the first aircraft subassemblies and the second aircraft subassemblies in parallel on separate assembly lines at the common geographic region comprises one or more of sending different components of the first aircraft subassemblies in series down the first assembly line and sending different components of the second aircraft subassemblies in series down the second assembly line.

17. The method of claim 16, wherein the sending the different components of the first aircraft subassemblies in series down the first assembly line comprises sending precursors of the right side wing and the left side wing down the first assembly line in series.

18. The method of claim 13, further comprising feeding constituent parts along one or more feeder lines to various positions along one or more of the first assembly line and the second assembly line.

19. The method of claim 18, wherein the feeding the constituent parts comprises orienting the constituent parts and advancing the constituent parts towards one or more of the first assembly line and the second assembly line.

20. The method of claim 18, wherein the assembling the first aircraft subassemblies and the second aircraft subassemblies comprises adding the constituent parts to one or more precursor structures of one or more of the first aircraft subassemblies and the second aircraft subassemblies.

* * * * *